United States Patent
Ohlsson et al.

(10) Patent No.: US 11,122,427 B2
(45) Date of Patent: Sep. 14, 2021

(54) MANAGING SECURITY CONTEXTS AND PERFORMING KEY DERIVATION AT HANDOVER IN A WIRELESS COMMUNICATION SYSTEM

(71) Applicant: Telefonaktiebolaget LM Ericsson (publ), Stockholm (SE)

(72) Inventors: Oscar Ohlsson, Stockholm (SE); Gunnar Mildh, Sollentuna (SE); Prajwol Kumar Nakarmi, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 280 days.

(21) Appl. No.: 16/067,256

(22) PCT Filed: Apr. 18, 2018

(86) PCT No.: PCT/SE2018/050390
§ 371 (c)(1),
(2) Date: Jun. 29, 2018

(87) PCT Pub. No.: WO2019/066692
PCT Pub. Date: Apr. 4, 2019

(65) Prior Publication Data
US 2020/0092718 A1    Mar. 19, 2020

Related U.S. Application Data

(60) Provisional application No. 62/563,210, filed on Sep. 26, 2017.

(51) Int. Cl.
*H04W 12/041*    (2021.01)
*H04W 8/02*    (2009.01)
(Continued)

(52) U.S. Cl.
CPC .......... *H04W 12/041* (2021.01); *H04W 8/02* (2013.01); *H04W 36/0038* (2013.01); *H04W 36/14* (2013.01)

(58) Field of Classification Search
CPC .............. H04W 12/0401; H04W 8/02; H04W 36/0038; H04W 36/14; H04L 2209/80; H04L 12/04
See application file for complete search history.

(56) References Cited

U.S. PATENT DOCUMENTS 8,467,356 B2 * 6/2013 Maeda .................... H04W 8/26
370/338
8,559,387 B2 * 10/2013 Dwyer ............ H04W 36/00835
370/331
(Continued)

FOREIGN PATENT DOCUMENTS

CN    201710633559    *    7/2017
JP    2013516841 A    5/2013
(Continued)

OTHER PUBLICATIONS

"3rd Generation Partnership Project; TS Group Radio Access Network; Evolved Universal Terrestrial Radio Access (E-UTRA) and Evolved Universal Terrestrial Radio Access Network (E-UTRAN) Release 14"; https://www.etsi.org/deliver/etsi_ts/136300_136399/136300/14.04.00_60/ts_136300v1404 (Year: 2017).*
(Continued)

*Primary Examiner* — Oleg Korsak
*Assistant Examiner* — Feliciano S Mejia
(74) *Attorney, Agent, or Firm* — Murphy, Bilak & Homiller, PLLC

(57) ABSTRACT

There is provided a method for determining a security context for communication between a wireless device and a target network node at handover. The method comprises obtaining (S1) information representative of the type of
(Continued)

Radio Access Technology, also referred to as RAT type, of the target network node, and deriving and/or determining (S2) the security context at least partly based on the information representative of the RAT type.

26 Claims, 21 Drawing Sheets

(51) Int. Cl.
*H04W 36/00* (2009.01)
*H04W 36/14* (2009.01)

(56) References Cited

U.S. PATENT DOCUMENTS

| | | | | |
|---|---|---|---|---|
| 8,838,102 | B2* | 9/2014 | Kazmi | H04W 48/20 455/435.3 |
| 9,161,281 | B2* | 10/2015 | Vrzic | H04W 36/0066 |
| 9,756,523 | B2* | 9/2017 | Zhang | H04W 28/0278 |
| 9,961,542 | B2* | 5/2018 | Rajadurai | H04L 63/068 |
| 10,009,326 | B2* | 6/2018 | Zhang | H04W 88/06 |
| 10,028,307 | B2* | 7/2018 | Lee | H04W 12/0401 |
| 10,080,170 | B2* | 9/2018 | Jin | H04W 36/14 |
| 10,116,685 | B2* | 10/2018 | Basu Mallick | H04L 63/068 |
| 10,257,078 | B2* | 4/2019 | Faccin | H04W 76/16 |
| 10,419,980 | B2* | 9/2019 | Lee | H04W 36/0022 |
| 10,432,291 | B2* | 10/2019 | Agiwal | H04W 12/0013 |
| 10,433,359 | B2* | 10/2019 | Adjakple | H04W 28/0252 |
| 10,624,006 | B2* | 4/2020 | Hampel | H04L 63/166 |
| 10,728,757 | B2* | 7/2020 | Wu | H04W 12/009 |
| 10,841,872 | B2* | 11/2020 | Lee | H04W 76/30 |
| 10,880,788 | B2* | 12/2020 | Tomici | H04W 36/0022 |
| 2011/0158162 | A1 | 6/2011 | Mizikovsky et al. | |
| 2017/0231020 | A1* | 8/2017 | Tomici | H04W 12/069 |
| 2017/0359719 | A1* | 12/2017 | Li | H01M 10/42 |
| 2018/0343249 | A1* | 11/2018 | Hahn | H04L 63/0869 |
| 2018/0376330 | A1* | 12/2018 | Basu Mallick | H04W 12/0401 |
| 2019/0037454 | A1* | 1/2019 | Lee | H04W 36/00837 |
| 2019/0059128 | A1* | 2/2019 | Gage | H04W 52/0206 |
| 2019/0191348 | A1* | 6/2019 | Futaki | H04W 36/14 |
| 2019/0253888 | A1* | 8/2019 | Jerichow | H04W 12/009 |
| 2019/0254097 | A1* | 8/2019 | Prasad | H04W 8/22 |
| 2019/0349819 | A1* | 11/2019 | Xu | H04W 36/0033 |
| 2020/0092718 | A1* | 3/2020 | Ohlsson | H04W 12/0401 |
| 2020/0187064 | A1* | 6/2020 | Susitaival | H04W 36/0069 |
| 2021/0022066 | A1* | 1/2021 | Pelletier | H04W 72/0453 |

FOREIGN PATENT DOCUMENTS

| | | |
|---|---|---|
| WO | 2011039655 A1 | 4/2011 |
| WO | 2016134536 A1 | 9/2016 |

OTHER PUBLICATIONS

3GPP TS 23.501 V1.3.0 (Sep. 2017), 3rd Generation Partnership Project; Technical Specification Group Services and System Aspects; System Architecture for the 5G System; Stage 2 (Release 15), Sep. 2017, pp. 1-174.

3GPP TS 23.502 V1.0.0 (Sep. 2017), 3rd Generation Partnership Project; Technical Specification Group Services and System Aspects; Procedures for the 5G System; Stage 2 (Release 15), Sep. 2017, pp. 1-166.

3GPP TS 33.220 V15.0.0 (Jun. 2017), 3rd Generation Partnership Project; Technical Specification Group Services and System Aspects; Generic Authentication Architecture (GAA); Generic Bootstrapping Architecture (GBA) (Release 15), Jun. 2017, pp. 1-93.

3GPP TS 33.401 V15.1.0 (Sep. 2017), 3rd Generation Partnership Project; Technical Specification Group Services and System Aspects; 3GPP System Architecture Evolution (SAE); Security architecture (Release 15), Sep. 2017, pp. 1-161.

3GPP TS 38.300 V1.0.0 (Sep. 2017), 3rd Generation Partnership Project; Technical Specification Group Radio Access Network; NR; NR and NG-RAN Overall Description; Stage 2 (Release 15), Sep. 2017, pp. 1-59.

3GPP TS 38.413 V0.3.0 (Aug. 2017), 3rd Generation Partnership Project; Technical Specification Group Radio Access Network; NG Radio Access Network (NG-RAN); NG Application Protocol (NGAP) (Release 15), Aug. 2018, pp. 1-57.

3GPP TS 38.423 V0.2.0 (Jun. 2017) 3rd Generation Partnership Project; Technical Specification Group Radio Access Network; NG Radio Access Network (NG-RAN); Xn application protocol (XnAP) (Release 15), Jun. 2017, pp. 1-43.

ETSI TS 133 401 V14.3.0 (Jul. 2017), Digital cellular telecommunications system (Phase 2+) (GSM); Universal Mobile Telecommunications System (UMTS); LTE—3GPP System Architecture Evolution (SAE); Security architecture (3GPP TS 33.401 version 14.3.0 Release 14), Jul. 2017, pp. 1-79.

"Correction of NG-based handover", 3GPP TSG-RAN WG3 Meeting #95, R3-170717, Athens, Greece, Pseudo Change Request, Feb. 13-17, 2017, pp. 1-3.

"New solution—Security of Access Stratum (AS) keys on Xn handover", 3GPP TSG-SA WG3 Meeting #86, S3-170219, Sophia Antipolis, France, revision of S3-17abcd, Feb. 6-10, 2017, pp. 1-2.

\* cited by examiner

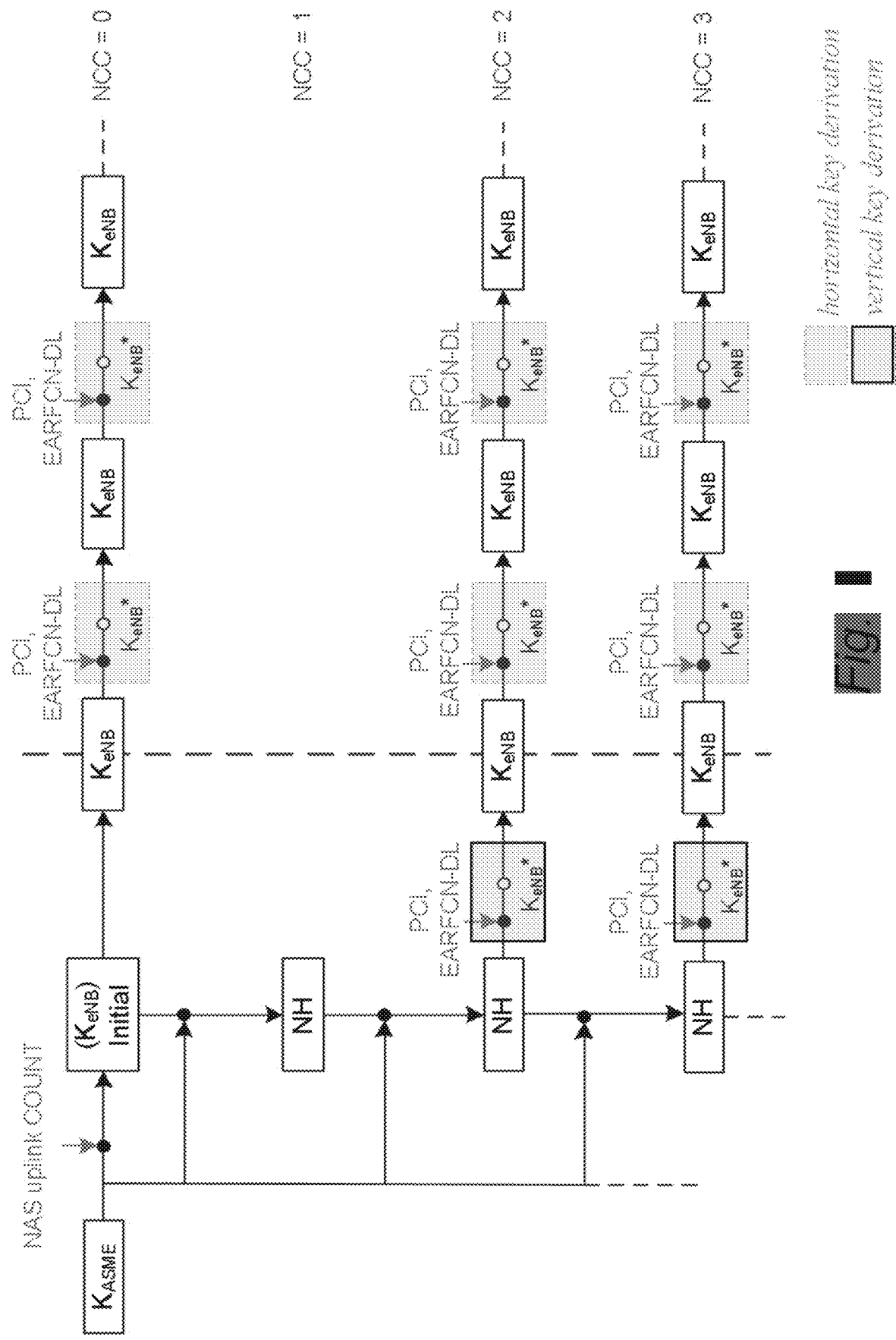

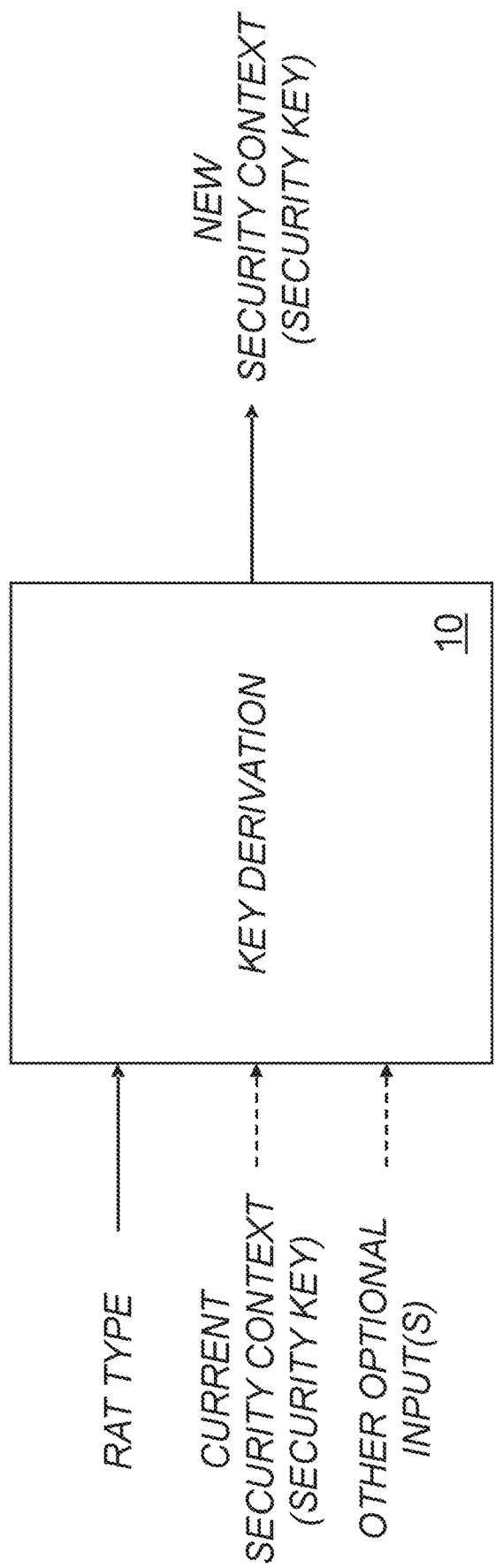

MANAGING SECURITY CONTEXTS AND PERFORMING KEY DERIVATION AT HANDOVER IN A WIRELESS COMMUNICATION SYSTEM

TECHNICAL FIELD

The proposed technology generally relates to wireless communication technology, and more specifically to managing security contexts and performing key derivation at handover in a wireless communication system.

BACKGROUND

Wireless communication systems are constantly evolving and intense research and development take place all over the world.

There is now a wide variety of different types and/or generations of wireless communication systems and technologies, including different types of radio access technologies such as Long Term Evolution (LTE) and New Radio (NR), sometimes referred to as 3G/4G and 5G.

The 3GPP TS 23.501 describes the 5G network architecture. A stripped down simplified version of 5G network is shown in FIG. 1.

The UE (User Equipment) is a mobile device used by the user to wirelessly access the network. The radio access network (RAN) function or base station denoted as RAN node is responsible for providing wireless radio communication to the UE and connecting the UE to the core network. The core network function called AMF (Access and Mobility Management Function) is responsible for handling the mobility of the UE, among other responsibilities. Another core network function called UPF (User Plane Function) is responsible for interconnecting to data network, packet routing and forwarding, among other responsibilities.

The UE interacts with the RAN node over-the-air using radio interface. The RAN node in turn interacts with the AMF using the interface called N2. The RAN node interacts with the UPF using the interface called N3. The RAN nodes themselves interact with each other using the Xn interface.

In general, it can be said that the 5G system defined by 3GPP includes both a new radio access network (NG-RAN) and new core network (5G-CN). Relating to FIG. 1, the NG-RAN includes RAN node and the 5G-CN includes the AMF and the UPF.

Similar to radio access network in 4G or LTE (Long Term Evolution) system, called E-UTRAN (Evolved Universal Terrestrial Radio Access Network), the NG-RAN uses a flat architecture and includes base stations, called gNBs (Next Generation Node Bs), which are inter-connected via the Xn-interface and towards the core network by the N2/N3-interface. A smallest coverage area in which the gNB serves the UEs is called a cell. The gNB supports one or more cells which provides the radio access to the UE. The radio access technology (called next radio, NR) is OFDM (Orthogonal Frequency Division Multiplexing) based like in LTE and offers high data transfer speeds and low latency.

It is expected that NR will be rolled out gradually on top of the legacy LTE network starting in areas where high data traffic is expected. This means that NR coverage will be limited in the beginning and users must move between NR and LTE as they go in out of coverage. To support fast mobility between NR and LTE and to avoid change of the core network, LTE base stations called eNBs (E-UTRAN Node Bs or Evolved Node Bs) will also connect to the 5G-CN and support the Xn interface. An eNB connected to 5GC is called a next generation eNB (ng-eNB) and is considered part of the NG-RAN (see FIG. 2).

The logical aspects between the UE and the AMF is referred to as NAS (non-access stratum) and that between the UE and the NG-RAN is referred to as (access stratum). Correspondingly, the security of communication (control plane and user plane, if applicable) are referred to as NAS security and AS security, respectively. The base security key (NAS-base key) on which the NAS security is based is denoted as $K_{AMF}$. From this $K_{AMF}$, further key derivations result in other keys that are used to provide confidentiality and integrity protection of NAS messages (mostly control plane). The $K_{AMF}$ is also used to derive another base key (AS-base key) on which the AS security is based on, denoted as $K_{gNB}$, irrespective of whether the RAN node is a gNB or an ng-eNB. From this $K_{gNB}$, further key derivations result in other keys that are used to provide confidentiality and integrity protection of AS messages (both control plane and user plane).

Handover Procedure

The 3GPP specifications TS 38.300, TS 23.502, TS 38.413, and TS 38.423 describe various aspects of the handover procedures in the 5G system. Mind that the 5G specification is work in progress and whenever the specification is missing some information, it will be assumed to work with similarity to the LTE system.

When the UE move from one cell to another cell while having active radio connection, i.e., while in RRC_CONNECTED mode, the source cell prepares and hands over the information related to the UE to the target cell so that the target cell can start serving the UE. This handing over mechanism is intuitively called a handover procedure. In other words, the handover procedure provides mobility support for UEs that are moving from one cell to another cell. In general, there are 3 types of handover as follow (illustrated in FIG. 3):

(1) Intra-Cell Handover

When the source and target cells are the same and served by the same RAN node, then intra cell communication are all internal to that RAN node, the corresponding handover being called an intra-cell handover. It could also happen that the source and the target cells are different but served by the same RAN node. Such handover could be called intra-RAN-node handover. But for our purpose, we do not need to differentiate between intra-cell and intra-RAN-node handover.

(2) Xn-Handover

When the source and the target cells belong to different RAN nodes, and those RAN nodes have Xn interface between them, then the inter cell communication takes place via the Xn interface, the corresponding handover being called an Xn-handover.

(3) N2-Handover

When there is no Xn interface between the RAN nodes, the handover is facilitated by the AMF, the corresponding handover being called an N2-handover. During an N2-handover, it could also happen that the source cell/RAN node and the target cell/RAN node belong to different AMFs. Such handover is still called N2-handover, however, there will be additional inter AMF communication.

Similar to LTE, a handover in 5G is likely to include three phases: handover preparation, handover execution, and handover completion. The Xn-handover is the default procedure and is used when there is an Xn interface between the source and target node. If there is no Xn interface or if the handover preparation fails, then N2-handover is initiated. Again, similar to the LTE system, the UE behavior is likely to be unified regardless if a handover is of type intra-cell, Xn, or N2. In other words, the UE should have to neither identify the type of handover nor behave differently for different type of handover. That means, on the UE side, the handling of the target node is expected to be similar regardless of the type of handover.

Security and key handling at handover will be of utmost importance. 5G (and similar future generations) is a very special generation of mobile networks because it is the first time when a core network of one mobile generation supports radio access technologies belonging to multiple mobile generations. The 5G-CN supports NG-RAN and NG-RAN includes both gNB (NR type belonging to 5G) and ng-eNB (E-UTRA/LTE type belonging to 4G). The handovers in 5G can therefore be between two gNBs, between two ng-eNBs, and between gNB and ng-eNB. Therefore, it is challenging to have a simple and preferably harmonized way of key derivations in handovers while still maintaining desired security properties. Note that handovers when the UE remains within the same core network are known as intra system handovers. This term is used regardless if the handover involves a change of RAT or not.

SUMMARY

It is an object to provide an improved way of managing security contexts and/or handling key derivation in wireless communication systems having network nodes of different radio access technologies, e.g. belonging to different system generations.

In particular it may be desirable to provide a security context for communication between a wireless device and a target network node at handover from a source network node to the target network node.

It is a specific object to provide a method for determining a security context for communication between a wireless device and a target network node at handover.

It is also an object to provide a device configured to determine a security context.

Another object is to provide a wireless device comprising such a device.

Yet another object is to provide a network node comprising such a device.

Still another object is to provide a network device comprising such a device.

It is also an object to provide a computer program and a corresponding computer-program product for determining, when executed, a security context for communication between a wireless device and a target network node at handover.

Another object is to provide an apparatus for determining a security context for communication between a wireless device and a target network node at handover.

These and other objects are met by embodiments of the proposed technology.

According to a first aspect, there is provided a method for determining a security context for communication between a wireless device and a target network node at handover. The method comprises:
  obtaining information representative of the type of Radio Access Technology, also referred to as RAT type, of the target network node; and
  deriving and/or determining the security context at least partly based on the information representative of the RAT type.

According to a second aspect, there is provided a device configured to determine a security context for communication between a wireless device and a target network node at handover. The device is configured to obtain information representative of the type of Radio Access Technology, also referred to as RAT type, of the target network least partly based on the information representative of the RAT type.

According to a third aspect, there is provided a wireless communication device comprising a device according to the second aspect.

According to a fourth aspect, there is provided a network node comprising a device according to the second aspect.

According to a fifth aspect, there is provided a network device comprising a device according to the second aspect.

According to a sixth aspect, there is provided a computer program for determining, when executed, a security context for communication between a wireless device and a target network node at handover. The computer program comprises instructions, which when executed by at least one processor, cause the at least one processor to:
  obtain information representative of the type of Radio Access Technology, also referred to as RAT type, of the target network node; and
  derive and/or determine the security context at least partly based on the information representative of the RAT type.

According to a seventh aspect, there is provided a computer-program product comprising a computer-readable medium having stored thereon such a computer program.

According to an eighth aspect, there is provided an apparatus for determining a security context for communication between a wireless device and a target network node at handover. The apparatus comprises:
  an obtaining module for obtaining information representative of the type of Radio Access Technology, also referred to as RAT type, of the target network node; and
  a deriving module for deriving and/or determining the security context at least partly based on the information representative of the RAT type.

In this way, it is possible to provide substantial improvements for managing security contexts and/or handling key derivation in wireless communication systems having network nodes of different radio access technologies, e.g. belonging to different system generations.

According to a ninth aspect, there is provided a method for secure communication between a wireless device and a target network node at handover, wherein the method comprises:
  obtaining information representative of the type of Radio Access Technology, also referred to as RAT type, of the target network node;
  deriving and/or determining a security context at least partly based on the information representative of the RAT type; and
  protecting the communication between the wireless device and the target network node based on the security context.

According to a tenth aspect, there is provided a device configured for secure communication between a wireless device and a target network node at handover, wherein the device is configured to obtain information representative of the type of Radio Access Technology, also referred to as RAT type, of the target network node;

wherein the device is configured to derive and/or determine a security context at least partly based on the information representative of the RAT type; and wherein the device is configured to protect the communication between the wireless device and the target network node based on the security context.

Another object is to provide a method performed by a wireless device for determining a security context for communication between the wireless device and a target network node at handover from a source network node to the target network node.

Yet another object is to provide a method performed by a network node for determining a security context for communication between a wireless device and a target network node at handover from a source network node to the target network node.

Still another object is to provide a wireless device and/or user equipment.

It is also an object is to provide a network node such as a base station.

Another object is to provide different embodiments of a communication system including a host computer, as well as corresponding methods implemented in such a communication system.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which:

FIG. 5 is a schematic diagram illustrating an example of the key handling in handover in LTE.

FIG. 7 is a schematic diagram illustrating an example of security context/key derivation based on RAT type according to an embodiment.

DETAILED DESCRIPTION

Figure 1:
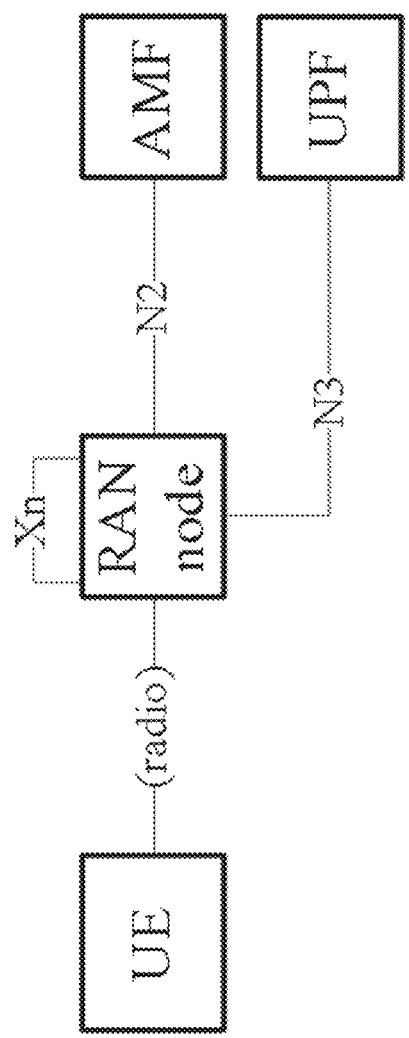
FIG. 1 is a schematic diagram illustrating an example of a simplified version of 5G network.
Figure 2:
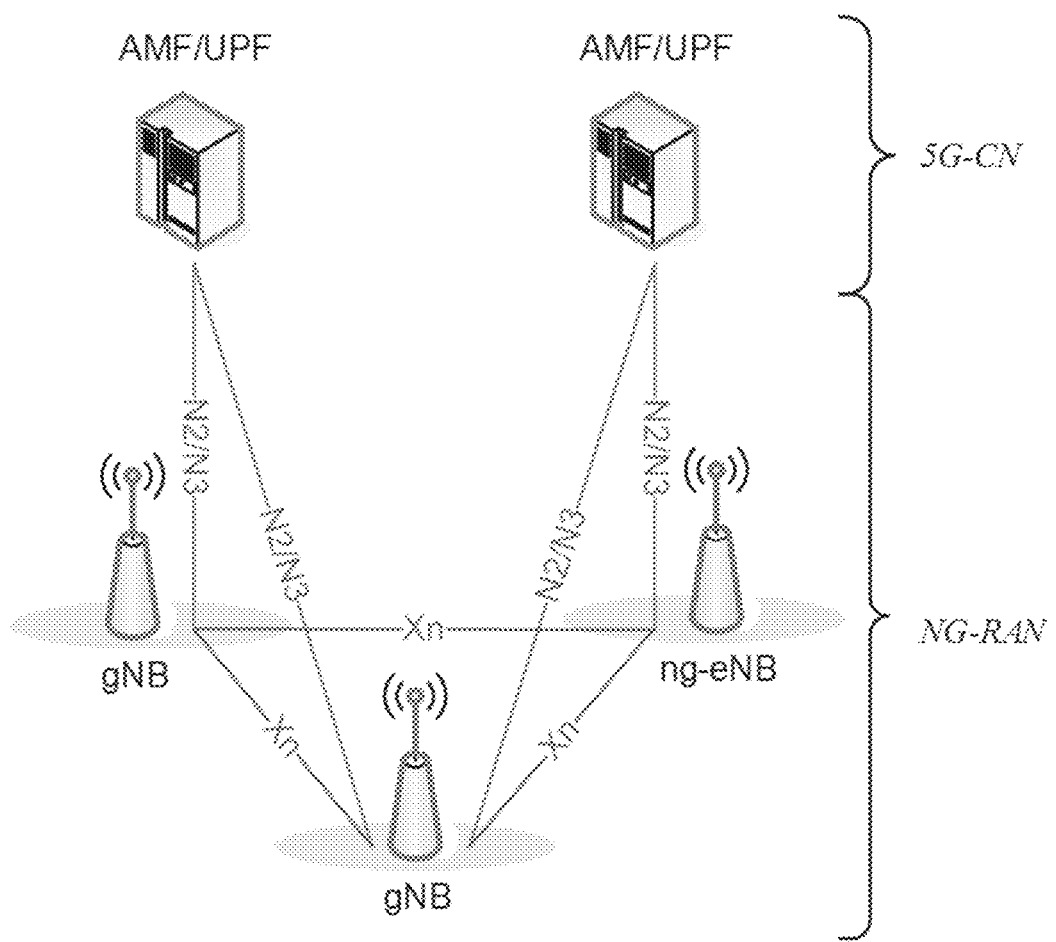
FIG. 2 is a schematic diagram illustrating an example of the NG-RAN (with gNB and ng-eNB) and 5G-CN.
Figure 3:
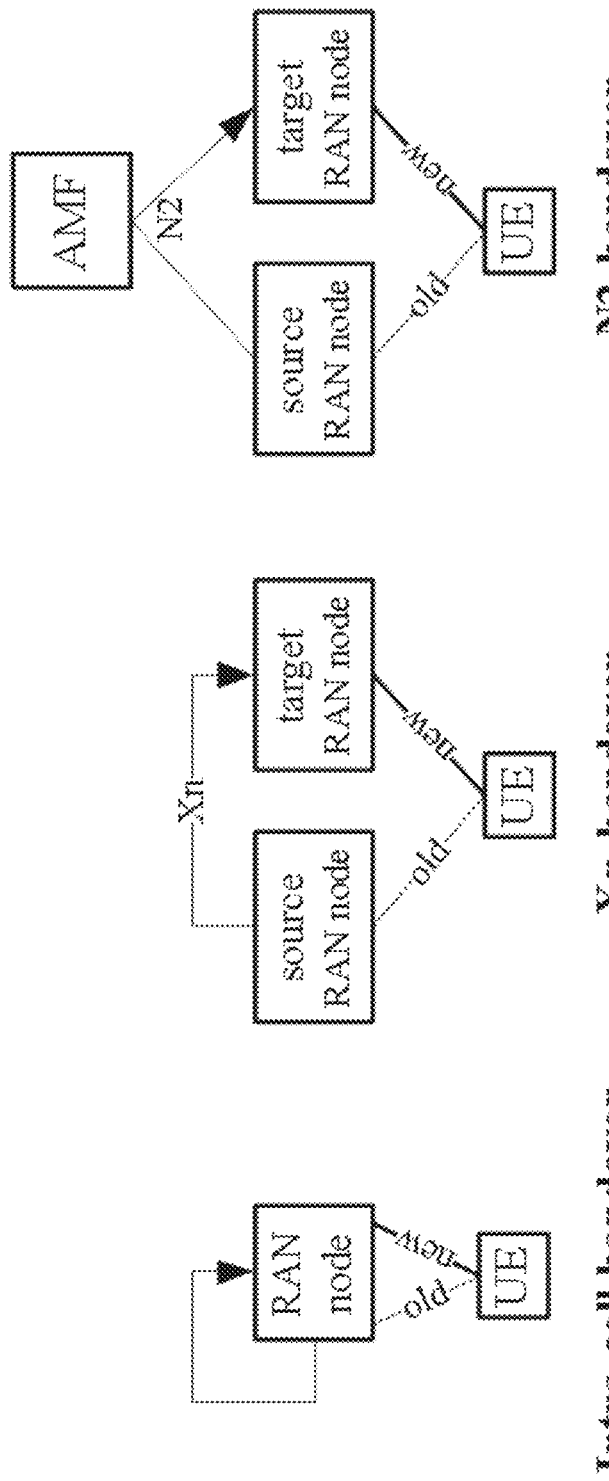
FIG. 3 is a schematic diagram illustrating an example of different types of handovers.

Throughout the drawings, the same reference designations are used for similar or corresponding elements.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the non-limiting terms "wireless communication device", "station", "User Equipment (UE)", and "terminal" may refer to a mobile phone, a cellular phone, a Personal Digital Assistant (PDA), equipped with radio communication capabilities, a smart phone, a laptop or Personal Computer (PC), equipped with an internal or external mobile broadband modem, a tablet with radio communication capabilities, a target device, a device to device UE, a machine type UE or UE capable of machine to machine communication, Customer Premises Equipment (CPE), Laptop Embedded Equipment (LEE), Laptop Mounted Equipment (LME), USB dongle, a portable electronic radio communication device, a sensor device equipped with radio communication capabilities or the like. In particular, the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the non-limiting term "network node" may refer to base stations, access points, network control nodes such as network controllers, radio network controllers, base station controllers, access controllers, and the like. In particular, the term "base station" may encompass different types of radio base stations including standardized base station functions such as Node Bs, or evolved Node Bs (eNBs), gNBs and/or ng-eNBs, and also macro/micro/pico radio base stations, home base stations, also known as femto base stations, relay nodes, repeaters, radio access points, Base Transceiver Stations (BTSs), and even radio control nodes controlling one or more Remote Radio Units (RRUs), or the like.

As used herein, the term "network device" may refer to any device located in connection with a communication network, including but not limited to devices in access networks, core networks and similar network structures. The term network device may also encompass cloud-based network devices.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

For a better understanding of the proposed technology, it may be useful to begin with a brief system overview and/or analysis of technical problem(s) and/or challenge(s), with reference to specific and non-limiting examples.

Figure 4:
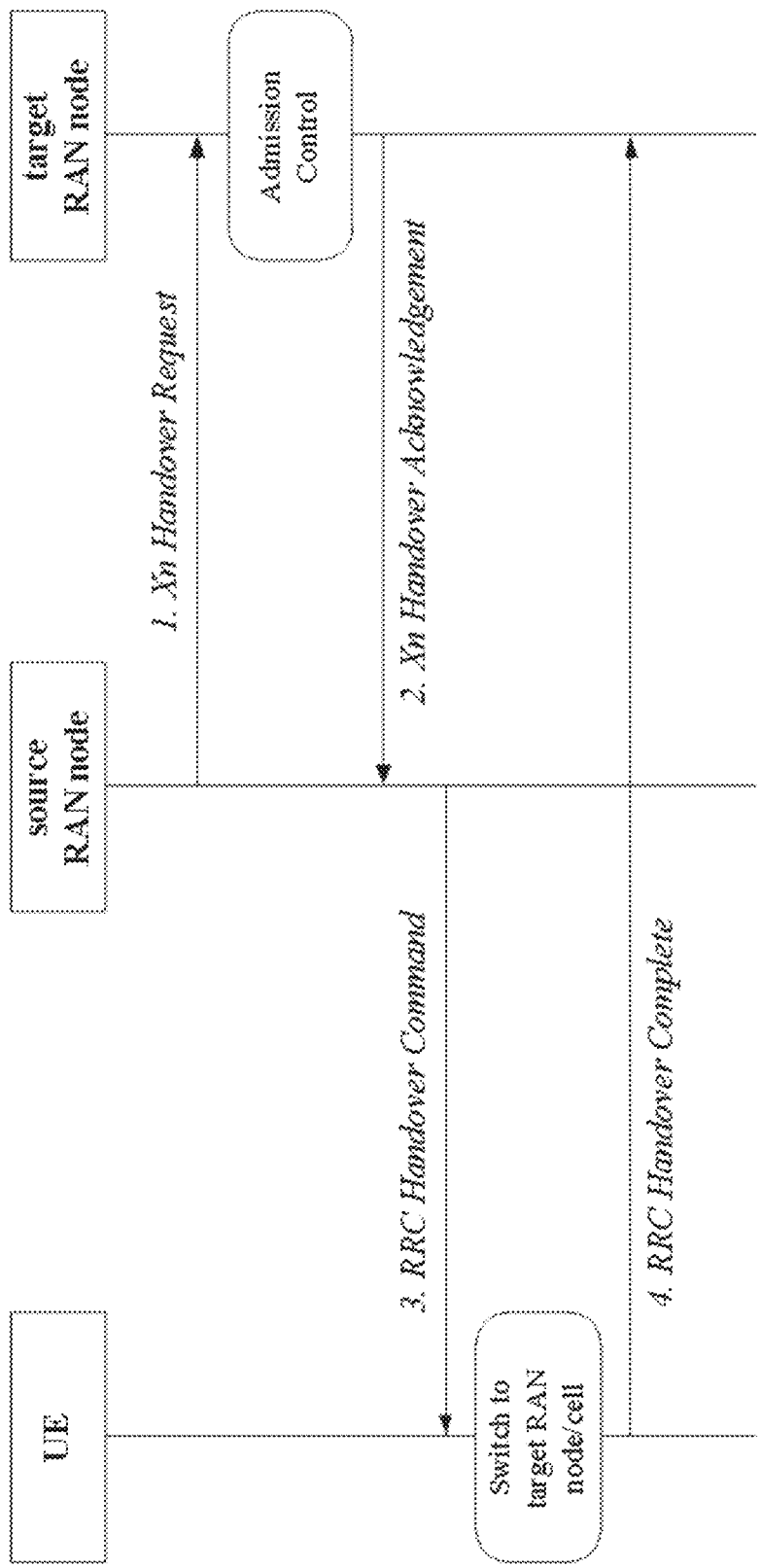
FIG. 4 is a schematic signaling diagram illustrating an example of the message flow during an Xn-handover.

FIG. 4 shows a simplified message flow during an Xn-handover. An N2-handover also arguably works in a similar way with the change that the source and target RAN node communicate indirectly via the AMF instead. For the purpose of our invention, and for the sake of simplicity, we will keep our explanation to the Xn-handover.

(1) Handover Preparation

In the handover preparation phase, the source and target RAN node prepare for a handover. In case of the Xn-handover, the source RAN node selects the target RAN node/cell for the handover and sends an Xn-handover request to the target RAN node, which includes the UE context information (e.g., S-TMSI which is a type of temporary mobile subscription identifier, bearer configuration, etc.) and security parameters (e.g., AS security keys, security synchronization information, etc.). If the target RAN node accepts the handover, it responds with an Xn-handover request acknowledge which contains the RRC (Radio Resource Control) handover command in a transparent container, meaning the RRC handover command is meant for the UE and is supposed to be transparent to the source RAN node.

(2) Handover Execution

In the handover execution phase, the actual handover is performed. The source RAN node sends the RRC handover command (that was received over Xn in the transparent container) to the UE which triggers the UE to access the target RAN node/cell. Once a new radio connection is established between the UE and the target RAN node, the UE sends a RRC handover complete to the target RAN node.

(3) Handover Completion

The final phase of the handover is the handover completion where the user plane path is moved from the source RAN node to the target RAN node. After this step both uplink (UL) and downlink (DL) user plane packets from and to the UE flow through the target RAN node.

Key Handling in Handover

In NR, as mentioned earlier, the control plane (called RRC for Radio Resource Control) and the user plane traffic is integrity and confidentiality protected between UE and gNB/ng-eNB based on a shared key, the AS-base key, denoted the $K_{gNB}$. As in LTE, it is very likely that a new AS-base key is computed in the UE and the network for the target RAN node at every handover. 5G will likely allow the AS-base key to be retained at certain handovers when the security termination point of the source RAN node/cell and target RAN node/cell do not change. For our purpose, we ignore that situation because it is not being super relevant. Changing AS-base key is important for security as it prevents the same key to be used more than once and provides compartmentalization between RAN nodes (i.e., a compromise of one RAN node should not affect the security of another RAN node).

FIG. 5 shows the key handling in handover in LTE as described in the Clause 7.2.8.1.1 of the 3GPP TS 33.401. It is likely that 5G will also adopt the similar mechanism. Note that the $K_{ASME}$ is analogous to the $K_{AMF}$, i.e., it is the NAS-base key and the $K_{eNB}$ is analogous to the $K_{gNB}$, i.e., it is the AS-base key. The NH and $K_{eNB*}$ are intermediary keys which will be described later. Mind that $K_{eNB*}$ will be analogous to $K_{gNB*}$. Each $K_{eNB}$ is associated with a NCC value, which will also be described later.

The derivation of the $K_{eNB*}$ from the $K_{eNB}$ is called horizontal key derivation, which is used during X2-handovers (analogous to Xn-handovers) as a part of handover preparation phase. The horizontally derived $K_{eNB*}$ is taken into use for the ongoing handover. The derivation of the $K_{eNB*}$ from the NH is called vertical key derivation, which is used during both X2-handover (analogous to Xn-handover) and S1-handover (analogous to N2-handover). During S1-handover (analogous to N2-handovers), as a part of a handover preparation phase, the vertically derived $K_{eNB*}$ is taken into use for the ongoing handover. However, during X2-handover (analogous to Xn-handover), as a part of handover completion phase, the vertically derived $K_{eNB*}$ is not taken into use for the ongoing handover, instead it is used for the next handover.

Now, let's discuss how key handling is expected to work in handovers in 5G. In the Xn-handover, the new AS-base key, denoted $K_{gNB*}$, is derived by the source RAN node and sent to the target RAN node in the handover request. Like in LTE, it is likely that there will be two types of key derivations. A first type, called horizontal key derivation, is the one where the $K_{gNB*}$ is derived from the current $K_{gNB}$, and a second type, called vertical key derivation, where $K_{gNB*}$ is derived from a Next Hop (NH) key. The latter is a security key computed by the AMF (and locally by the UE) from the $K_{AMF}$ security key and is provided to the RAN node during handover completion as a part of user plane path switch. Thus, the vertical key derivation can only be used if the source RAN node has acted as target RAN node in an earlier Xn-handover and hence has received a fresh NH from the AMF. Otherwise, if no NH is available or if the NH has already been used, the horizontal key derivation is used to derive the new AS-base key, i.e., $K_{gNB*}$. In the N2-handover, the AMF provides the target RAN node with a fresh NH in the handover preparation phase and the target RAN node computes the $K_{gNB*}$ using vertical key derivation.

On the UE side the handover behavior looks identical regardless if it is of type Xn or N2. To determine how to derive the new key the UE looks at the NH Chaining Counter (NCC) which the target RAN node includes in the RRC handover command. The NCC counts the number of vertical key derivations that has been performed and directly corresponds to a NH key. If the UE receives a NCC value which is unchanged, $K_{gNB*}$ is derived using horizontal key derivation from the current $K_{gNB}$. Otherwise, if the NCC is incremented, the UE computes the corresponding NH key and derives $K_{gNB*}$ using vertical key derivation.

The benefit of using vertical key derivation is that it provides forward security (i.e., a source RAN node is unable to decrypt or modify traffic in subsequent RAN nodes). In Xn-handover, since the {NCC, NH} pair is provided by the AMF to the target node as a part of user plane path switch, forward security is achieved only after another handover from the target node (i.e. after two hops). On the other hand, in the N2 handover forward security is achieved already after one hop since the AMF provides the NH in the handover preparation phase.

In LTE, both during horizontal and vertical key derivation, besides the current AS-base key or NH key, the following inputs are used in $K_{eNB*}$ key derivation:
  Physical Cell ID (PCI)
  Downlink E-UTRA Absolute Radio Frequency Channel Number (DL-EARFCN)

Mind that the $K_{eNB*}$ is analogous to the $K_{gNB*}$. The advantage of using the PCI and DL-EARFCN as input to the $K_{eNB*}$ key derivation is that different $K_{eNB*}$ keys are generated for different target cells, which also means different $K_{eNB*}$ keys are generated for different RAN nodes, enabling the preparation of multiple RAN nodes, e.g., at handover where each target RAN nodes get their own set of $K_{eNB*}$ keys. This enables the source RAN cell to at the last moment select which candidate target cell or RAN node to use for handover. The PCI and DL-EARFCN are also parameters the UE knows about when entering the target cell.

Note in this document the term $K_{gNB*}/K_{gNB*}$ is used to denote the AS base key in both a gNB and an ng-eNB. It would have been more accurate to use separate terms (e.g. $K_{gNB*}/K_{gNB*}$ and $K_{ng\text{-}eNB*}/K_{ng\text{-}eNB*}$), but for the sake of simplicity and brevity only a single term is used. It should be understood that the AS base security key may be given different names in the future, even generic names such as $K_{AN}*$, where AN stands for Access Network.

RRC Suspend/Resume 5G also updates the RRC state model and introduces a new RRC_INACTIVE state in addition to the existing RRC_IDLE and RRC_CONNECTED states inherited from LTE. In RRC_INACTIVE the UE context from the previous RRC connection is stored in the RAN and is re-used at the next RRC connection setup. The UE context could include information on the UE security configuration, configured data radio bearer etc. By storing the UE context in the RAN one can avoid the signaling required for security activation and bearer establishment which is normally required when transitioning from RRC_IDLE to RRC_CONNECTED. This improves latency and reduces the signaling overhead.

With RRC_INACTIVE the RRC connection can be suspended in one cell and later on resumed in another cell. When an RRC connection is resumed the UE transitions from RRC_INACTIVE to RRC_CONNECTED and the UE context is transferred from the source RAN node to the target RAN node. A new AS-base key is also derived for the target cell by the source node and transferred to the target node together with the UE context. It is also possible for the source RAN node to prepare multiple target RAN nodes/cells in advance to speed up the connection resumption when the UE becomes active. As can be seen, the transfer of the UE context and key handling for RRC_INACTIVE is in many ways similar to an Xn-handover.

As mentioned, 5G (and similar future generations) is a very special generation of mobile networks because it is the first time when a core network of one mobile generation supports radio access technologies belonging to multiple mobile generations. The 5G core network supports NG-RAN and NG-RAN includes both gNB (NR type belonging to 5G) and ng-eNB (E-UTRA/LTE type belonging to 4G). The handovers in 5G can therefore be between two gNBs, between two ng-eNBs, and between gNB and ng-eNB. Therefore, it is challenging to have a simple and preferably harmonized way of key derivations in handovers while still maintaining desired security properties.

It is therefore desirable to provide an improved way of handling key derivation in wireless communication systems having network nodes of different radio access technologies, e.g. belonging to different system generations.

Figure 6A:
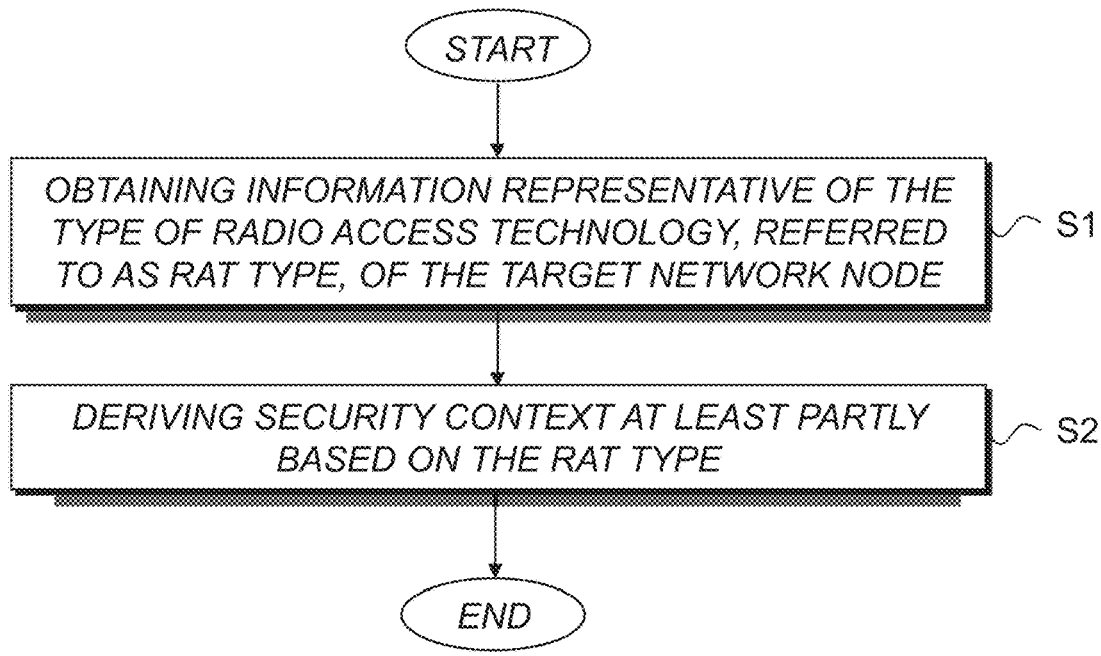
FIG. 6A is a schematic diagram illustrating an example of a method for determining a security context for communication between a wireless device and a target network node at handover.

According to a first aspect, there is provided a method for determining a security context for communication between a wireless device and a target network node at handover, as schematically illustrated in FIG. 6A.

Basically, the method comprises:

S1: obtaining information representative of the type of Radio Access Technology, also referred to as RAT type, of the target network node; and S2: deriving and/or determining the security context at least partly based on the information representative of the RAT type.

Figure 6B:
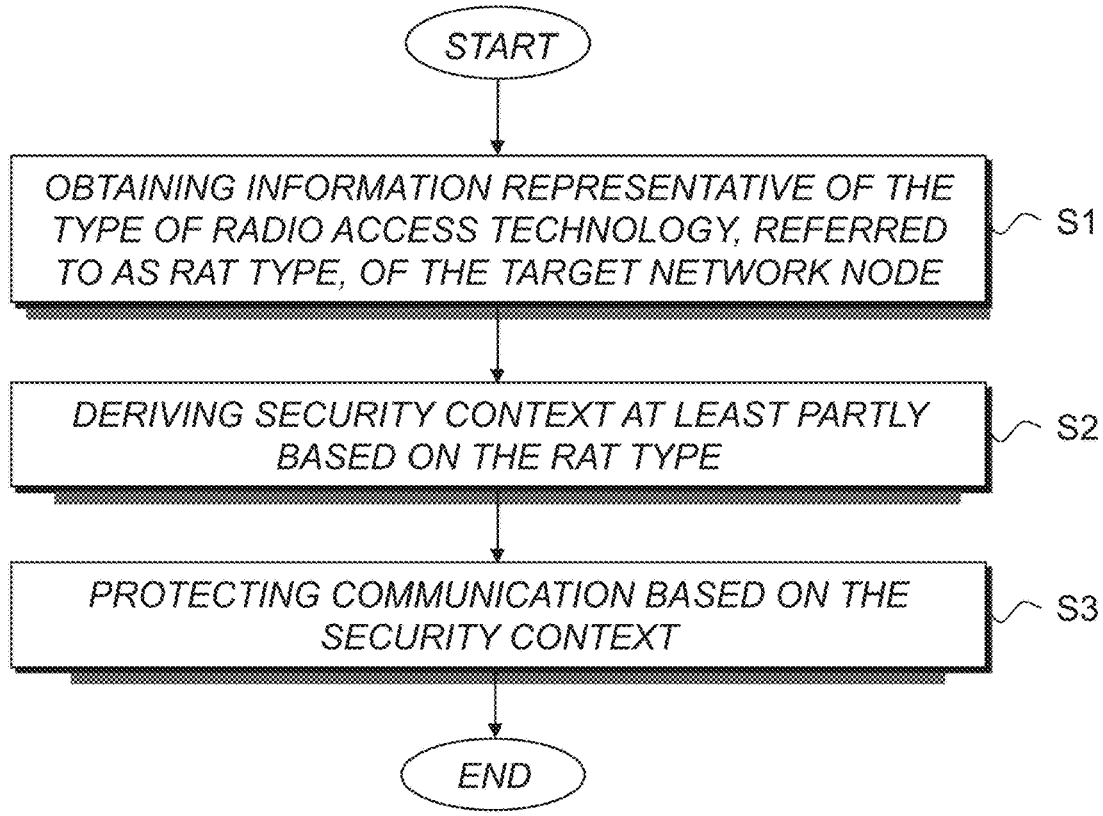
FIG. 6B is a schematic diagram illustrating an example of a method for secure communication between a wireless device and a target network node at handover.

The security context may for example be used for and/or include the optional step S3 of protecting communication between the wireless device and the target network node based on the security context, e.g. see FIG. 6B. Examples include providing integrity and/or confidentiality protection for transmission and/or reception of user data and/or control data between the wireless device and the target network node. By way of example, the RRC Handover Complete message (in the handover execution phase) between the wireless device and the target network node may be protected using a security key of the derived security context.

In other words, the communication may be protected by providing integrity and/or confidentiality protection for transmission and/or reception of user data and/or control data between the wireless device and the target network node.

The invention may be applied at intra-RAT and/or inter-RAT handovers. However, the proposed technology may be particularly useful at so called intra-system handovers, i.e. intra-RAT or inter-RAT handovers within the same core network (without a change of core network).

By way of example, the security context may be derived by taking the determined RAT type into account in the key derivation, as schematically illustrated in FIG. 7.

For example, the security context may comprise at least a security key.

As an example, the security key may be an Access Stratum (AS) base security key such as an AS base security key for protecting integrity and/or confidentiality of the communication between the wireless device and the target network node.

In a particular example, the base security key may be $K_{gNB*}$ or $K_{ng\text{-}eNB*}$.

The information representative of the RAT type may for example be obtained by receiving the information and/or by determining the information.

In a particular example, the information representative of the RAT type may be used together with information representative of a security key valid before handover to derive a new security key. For example, the information representative of a security key valid before handover could be information about an actual base security key used before handover, or an intermediary key such as a NH key valid before the handover.

As indicated, the key derivation may possibly use other optional input(s). For example, it is possible to use the RAT type in addition to information representing other properties of the target cell (like PCI and ARFCN) in the key derivation.

In other words, the information representative of the RAT type of the target network node may be used together with information representing additional properties of the target cell in the key derivation.

By way of example, the information representing properties of the target cell may include Physical Cell ID, PCI, and/or Absolute Radio Frequency Channel Number, ARFCN.

Figure 8:
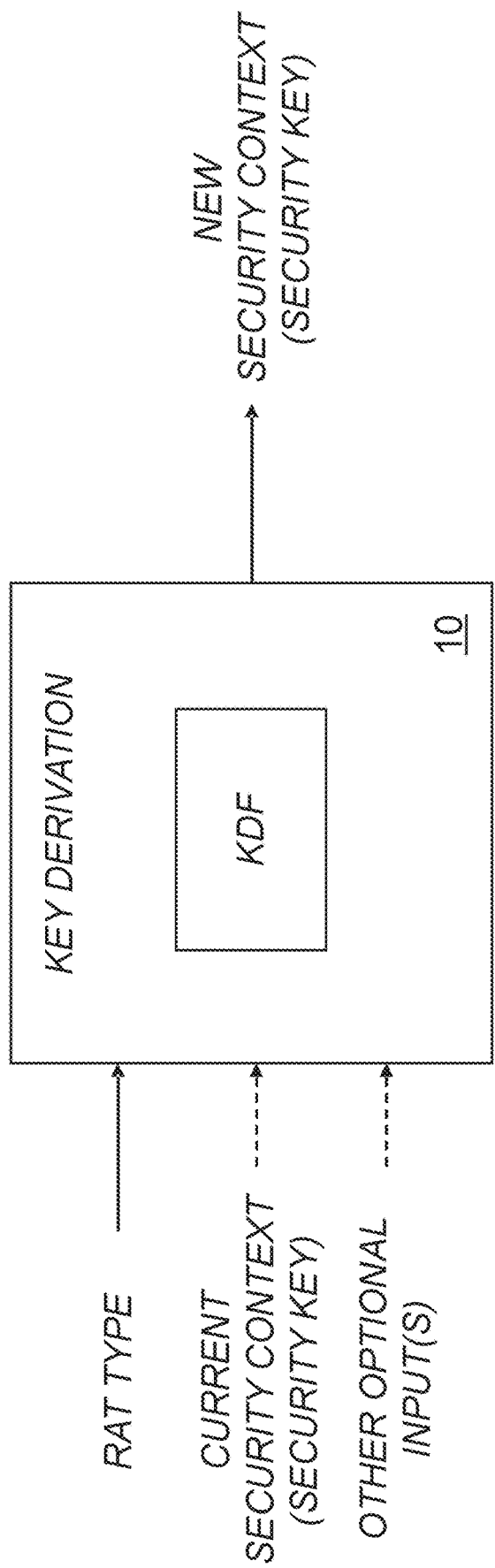
FIG. 8 is a schematic diagram illustrating an example of security context/key derivation based on RAT type, where an input parameter representative of the RAT type is used as input to a new or existing key derivation function.

FIG. 8 is a schematic diagram illustrating an example of security context/key derivation based on RAT type, where an input parameter representative of the RAT type is used as input to a new or existing key derivation function.

In a first set of examples, the step of deriving the security context at least partly based on the information representative of the RAT type is based on using an input parameter representative of the RAT type into a new or existing key derivation function (KDF).

For example, the RAT type may thus be included as an additional input to the key derivation ensuring the input parameter to the key derivation will be different for Long Term Evolution, LTE, and New radio, NR.

Figure 9:
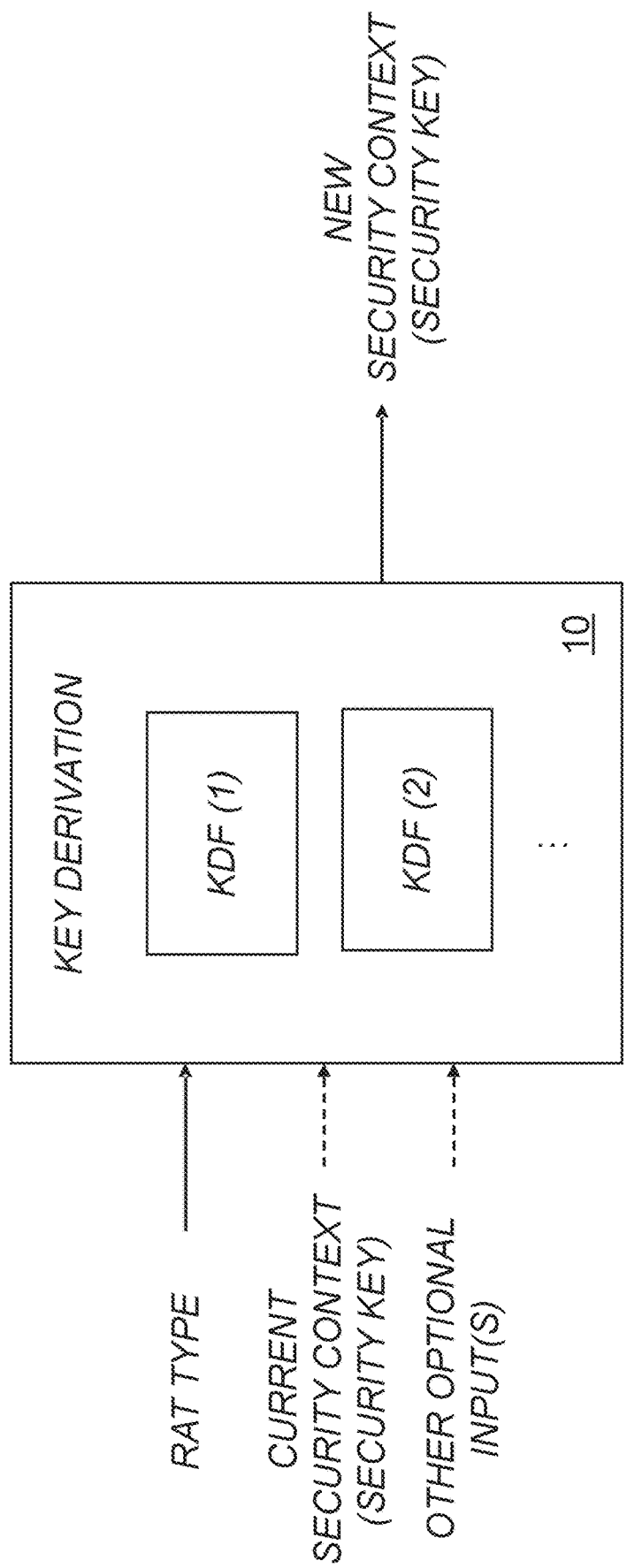
FIG. 9 is a schematic diagram illustrating an example of security context/key derivation based on RAT type, where different key derivation functions are used for different RAT types.

FIG. 9 is a schematic diagram illustrating an example of security context/key derivation based on RAT type, where different key derivation functions are used for different RAT types.

In a second set of examples, the step of deriving the security context at least partly based on the information representative of the RAT type is based on using different key derivation functions KDF(1), KDF(2), . . . for different RAT types.

For example, the RAT type is encoded into the key derivation function, KDF, by defining two separate KDFs, one for Long Term Evolution, LTE and one for New Radio, NR.

By way of example, the step of deriving and/or determining the security context is based on selecting key derivation function depending on the RAT type.

As an example, the method may be applied at intra-RAT and/or inter-RAT handovers within the same core network.

By way of example, the method may be performed by the wireless device such as a UE.

For example, the information representative of the RAT type may be obtained based on received information provided in the RRC handover command or based on received information broadcasted in the target cell.

Complementary, or alternatively, the method may be performed by a network node.

Normally, the handover is from a source network node to a target network node.

As an example, the method may be performed by the source network node, e.g. at Xn handover or intra-gNB handover.

For example, the source network node may be a source radio access network (RAN) node.

In a particular example, the handover is an Xn handover and the information representative of the RAT type is obtained based on Xn signaling or pre-configuration.

In another example, the method may be performed by the target network node, e.g. at N2 handover.

For example, the target network node may be a target radio access network (RAN) node.

In a particular example, the handover is a N2 handover and the information representative of the RAT type is obtained based on N2 signaling or pre-configuration.

Optionally, the method may be performed by a network device.

By way of example, the network device may be a network device in the core network.

For example, the network device in the core network may implement an Access and Mobility management Function (AMF).

In other words, the network device may be an AMF network device in the core network.

By way of example, the information representative of the RAT type may be obtained based on N2 signaling or pre-configuration.

Optionally, the network device may be a computer-implemented network device such as a cloud-based network device.

By way of example, the proposed technology provides a simple and secure mechanism of key derivations in handovers in 5G. The simplicity comes from at least one of:

Harmonized key derivation in handovers between the RAN nodes, either gNB or ng-eNB, which means there is no complicated handling for key derivations.

Similarity to key derivation in handovers in LTE, which means much of existing implementations could be reused in 5G, rather than a completely new implementation. This will directly be a cost-saver for UE and network vendors, and ultimately for operators. It will also mean easy to understand and cleaner 3GPP standard specification.

For example, the key derivation scheme also enables the usage of multi-cell preparation for handover and RRC_INACTIVE which could improve the cellular network and end user performance, for example:

Lead to shorter access delay

More robust handover (less handover or radio link failures leading to service outage)

More secure solution protecting end user privacy as well as securing the system against fraud.

For a better understanding, the proposed technology will now be described with reference to a number of non-limiting examples.

As discussed earlier, in 5G, the radio access network, NG-RAN will include RAN nodes which could be either of type NR, i.e., gNB, or of type E-UTRA/LTE, i.e., ng-eNB. Consequently the handovers could involve two gNBs, two ng-eNBs, or a gNB and an ng-eNB. So there is a challenge of how to perform key derivations at handovers, similar to the horizontal and vertical key derivations in LTE.

A potential solution could be to adopt a new mechanism for handovers in 5G. For example, using some form of counter (or more generally, a nonce) for the key derivation instead of PCI and DL-EARFCN. The counter is chosen and maintained by the source RAN node. On a superficial level, it might look like a straightforward and future proof solution because key derivation is no longer tied the architecture of the mobile network. We point out that such a solution is not acceptable, because the derivation of $K_{gNB*}$ will be decided solely by the source RAN node. This implies that the source RAN node can prepare multiple target RAN nodes with the same $K_{gNB*}$.

The UE is forced to comply with what source RAN node does. It means that this solution introduces a weaker security in 5G compared to the security in LTE. In LTE, the $K_{eNB*}$, analogous to $K_{gNB*}$, is bound to the target RAN node's properties that UE can independently acquire and misconfiguration or poor configuration or poor implementation of source RAN cannot comprise security completely. It will no longer be the case in 5G with this solution. Another drawback of the solution is that it requires more change to the existing implementation codes in LTE and therefore become expensive for UE vendors, network vendors and operators. Finally, yet another drawback is that the solution is not optimized for RRC_INACTIVE since the UE is generally not aware of the counter associated with a target cell when a RRC connection is resumed. This makes it difficult to encrypt and integrity protect data during connection resumption since the counter value must first be delivered to the UE. For such reasons, this solution is less desirable.

Another potential solution could be to adopt the LTE mechanism as is. In other words, to use the same parameters of the target RAN node as were used in LTE, i.e., the PCI and the DL-EARFCN of the target RAN node/cell for the derivation of the $K_{gNB*}$. We point that such a solution is also not acceptable. It is so because there is a completely new problem that did not exist in earlier generation of mobile networks where there was only one type of radio access technology. In other words, the problem is in NG-RAN and not in E-UTRAN because NG-RAN contains both NR and LTE cells whereas E-UTRAN only contains LTE cells. This means that in 5G, the PCIs and DL-EARFCNs for LTE cells are not necessarily aligned with the NR cells and therefore the PCIs and the DL-EARFCNs are likely not to be unique across the whole 5G system. This means that if $K_{gNB*}$ is computed using the same input parameters as in LTE (PCI, DL-EARFCN, and $K_{gNB}$/NH), then there is a risk of key collision when the source RAN node prepares multiple target RAN nodes/cells and those target RAN nodes/cells belong to different radio access technologies. In other words, there is risk that a gNB NR cell and an ng-eNB LTE cell receive the same $K_{gNB*}$ at handover preparation if the two cells share the same PCI and DL-EARFCN. This breaks the compartmentalization between nodes and implies a node may be able to decrypt and modify traffic generated in another node. The same problem also applies to RRC_INACTIVE when a source node prepares multiple target nodes. For such reasons, this solution is less desirable.

Next, we describe non-limiting examples of a new mechanism of $K_{gNB*}$ key derivation which solves the above mentioned new problem that arises in 5G and that did not exist in earlier generation of mobile networks. We propose that the AS-base key, denoted as $K_{gNB*}$ here, is derived with additional input parameter which will distinguish the radio access technology (RAT) of the target RAN node/cell, i.e., distinguish the gNBs from the ng-eNBs.

Figure 10:
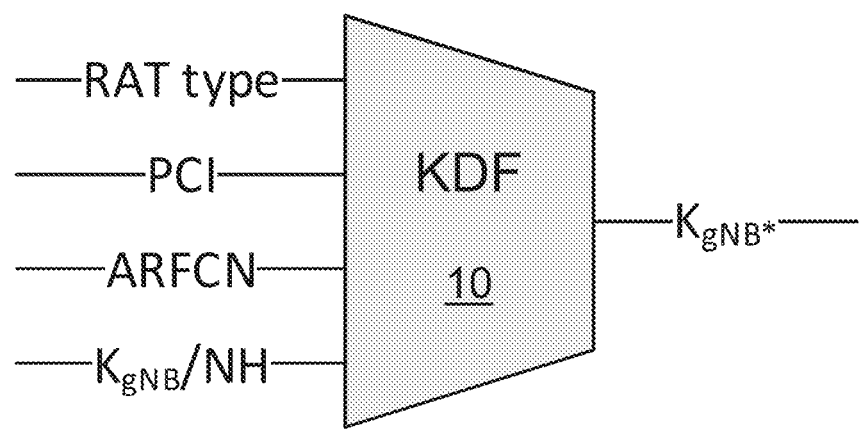
FIG. 10 is a schematic diagram illustrating a particular non-limiting example of key derivation according to an embodiment.

FIG. 10 is a schematic diagram illustrating a particular example of key derivation according to an embodiment.

FIG. 10 illustrates an example key derivation function (KDF) which is used to derive the new AS-base key, called $K_{gNB*}$ here, at handover in 5G. On a high level, the KDF may take four inputs:

| | |
|---|---|
| RAT type | Radio Access Technology, either NR or E-UTRA/LTE; |
| PCI | PCI of NR or E-UTRA/LTE cell; |
| DL-ARFCN | DL-NRARFCN for NR cells and DL-EARFCN for E-UTRA/LTE cells; and |
| $K_{gNB}$/NH | current $K_{gNB}$ or Next Hop, NH, key |

The new additional input called the RAT type may be encoded in different ways, e.g. a single bit (1 for NR and 0 for LTE), or string ("nr" for NR and "lte" for LTE). The KDF could be the extension of the existing LTE KDF specified in Clause A.5 in 3GPP TS 33.401. In that case, the same Function Code (FC) value, i.e. 0x13, would be reused, P0/L0 (PCI, and length of PCI) would be reused, P1/L1 (DL-ARFCN and length of DL-ARFCN) would be reused and P2/L2 (RAT type and length of RAT type) would be additional input. It is also possible to define a new KDF, e.g., by using a new FC value, other than 0x13, in the generic KDF (explained below) or by using some different KDF based on some other algorithm. In this case, the order of the parameters could be different. Also note that additional inputs (i.e. other than the four mentioned above) could also be added to the KDF.

Note that the RAT type can be included in other ways as well. For example, instead of using a separate parameter for the RAT type, it is also possible to encode the RAT type into the KDF itself by defining two separate KDFs, one for NR and one for LTE. Similar to above, this can be accomplished e.g., by using a new FC value, other than 0x13, in the generic KDF (explained below) or by using some different KDF based on some other algorithm. The source RAN node would then use the new NR KDF at handover to an NR cell (belonging to gNB) and the existing/legacy LTE KDF at handover to an LTE cell (belonging to ng-eNB). An advantage with using different KDFs for NR and LTE is that then it would be possible to reuse the existing LTE KDF and existing input parameters for UEs on LTE side while still ensuring that different keys are generated on the NR side (i.e. that the RAT type is considered as input to the key generation, in this case selecting which KDF to be used). It also possible to define new KDFs both for NR and for LTE. In this case the existing/legacy LTE KDF would not be used but only the new KDFs.

Different KDFs can e.g. be created from the generic KDF defined in 3GPP TS 33.220 by using different values for the FC parameter. The generic KDF takes a key and bit string S as input and produces a 256 bit key as output, where S is formed by concatenating the fixed length FC and all the input parameters (except the key). Since FC occurs first in S, the input is guaranteed to be different even if the bit string formed from the other input parameters are identical.

In case it is decided that NR would not use PCI and/or ARFCN as input parameters to the KDF and instead use one or more other parameter with similar purpose, there is still a risk that this or these parameter(s) would generate the same input bit string as the PCI and ARFCN used in LTE. In order to avoid this problem it is also possible to include the RAT type as a distinguishing factor ensuring different input to the KDF regardless of RAT.

With the proposed technology, there is a new effect in that the NR and LTE target RAN nodes/cells receive distinct keys during handover preparation phase even if the PCI and ARFCN of two cells happen to be the same or if the parameters used in NR related to the target cell or RAN node has the identical value as a PCI and ARFCN in LTE. This is achieved by including the RAT type as an additional input to the key derivation ensuring the input parameter to the key derivation will always be different for LTE and NR. Alternatively, different key derivation functions (KDFs) are used for deriving keys depending on if the target RAT is NR or LTE. Our invention maintains the security properties, present in LTE, i.e., the security of new AS-base key is not decided by source RAN node alone because UE can independently acquire target RAN node's PCI and ARFCN.

During handover, the source RAN node (in case of Xn-handover) or target RAN node (in case of N2 handover) can determine the RAT type of the target cell/target node required for the key derivation based on e.g., Xn or N2 signaling or pre-configuration. If the derivation is performed by a core network node, e.g., AMF, then the RAT type can be determined based on e.g., N2 signaling or pre-configuration. On the UE side the RAT type can be determined based on e.g., information provided in the RRC handover command or based on information broadcasted in the target cell (e.g. synchronization signals or system information).

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to a second aspect, there is provided a device configured to determine a security context for communication between a wireless device and a target network node at handover. The device is configured to obtain information representative of the type of Radio Access Technology, also referred to as RAT type, of the target network node. The device is further configured to derive and/or determine the security context at least partly based on the information representative of the RAT type.

By way of example, the device may be configured to derive the security context by taking the determined RAT type into account in the key derivation.

For example, the security context may comprise at least a security key. In other words, the device may be configured to derive and/or determine at least a security key as part of the security context.

As an example, the security key may be an Access Stratum (AS) base security key such as an AS base security key for protecting integrity and/or confidentiality.

In a particular example, the base security key is $K_{gNB^*}$ or $K_{ng\text{-}eNB^*}$.

For example, the device may be configured to receive and/or determine the information representative of the RAT type.

By way of example, the device may be configured to derive a new security key to be used after handover by using the information representative of the RAT type together with information representative of a security key valid before handover.

In a first set of examples, the device may be configured to derive the security context at least partly based on the information representative of the RAT type by using an input parameter representative of the RAT type into a new or existing key derivation function.

In a second set of examples, the device may be configured to derive the security context at least partly based on the information representative of the RAT type by using different key derivation functions for different RAT types.

In a particular example, the device comprises a processor and a memory, the memory comprising instructions executable by the processor, whereby the processor is operative to derive and/or determine the security context, as will be discussed later on.

According to a third aspect, there is provided a wireless device comprising a device according to the second aspect.

According to a fourth aspect, there is provided a network node comprising a device according to the second aspect.

In a first example, the network node may be a source network node.

For example, the source network node may be a source radio access network (RAN) node.

In a second example, the network node is a target network node.

For example, the target network node may be a target radio access network (RAN) node.

According to a fifth aspect, there is provided a network device comprising a device according to the second aspect.

By way of example, the network device may be a network device in the core network.

For example, the network device in the core network may implement an Access and Mobility management Function (AMF). In other words, the network device may be an AMF network device in the core network.

As an example, the network device may be a computer-implemented network device such as a cloud-based network device.

Figure 11:
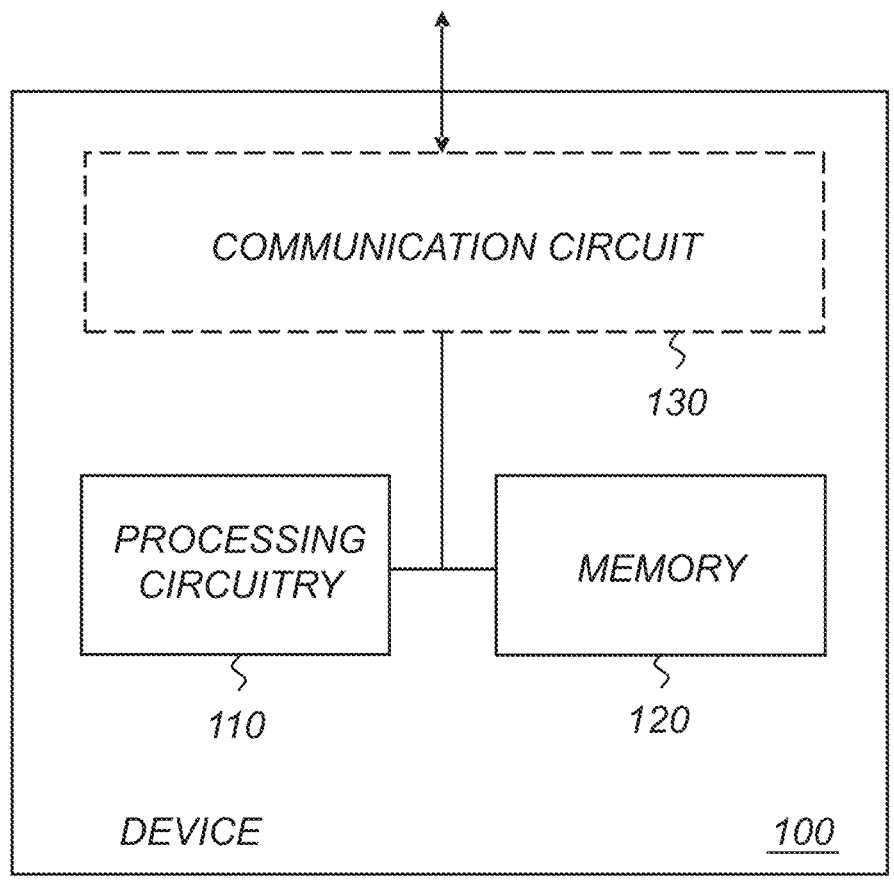
FIG. 11 is a schematic diagram illustrating an example of a device configured to determine a security context according to an embodiment.

FIG. 11 is a schematic diagram illustrating an example of a device configured to determine a security context according to an embodiment. In this particular example, the device 100 comprises a processor 110 and a memory 120, the memory 120 comprising instructions executable by the processor 110, whereby the processor is operative to perform at least some of the steps, actions and/or functions described herein.

Optionally, the device 100 may also include a communication circuit 130. The communication circuit 130; 230 may include functions for wired and/or wireless communication with other devices and/or network nodes in the network. In a particular example, the communication circuit 130 may be based on radio circuitry for communication with one or more other nodes, including transmitting and/or receiving information. The communication circuit 130 may be interconnected to the processor 110 and/or memory 120. By way of example, the communication circuit 130 may include any of the following: a receiver, a transmitter, a transceiver, input/output (I/O) circuitry, input port(s) and/or output port(s).

Figure 12:
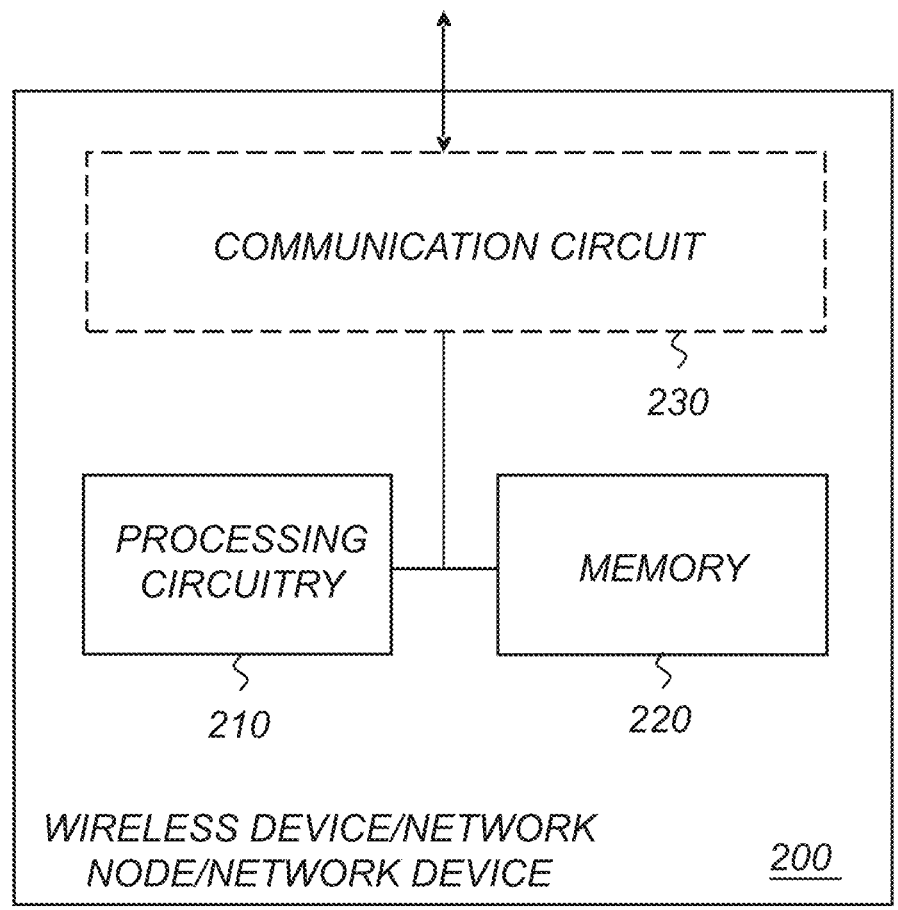
FIG. 12 is a schematic diagram illustrating an example of a wireless device, network node or network device according to an embodiment.

FIG. 12 is a schematic diagram illustrating an example of a wireless device, network node or network device according to an embodiment. In this particular example, the wireless device, network node or network device 200 comprises a processor 210 and a memory 220, the memory 220 comprising instructions executable by the processor 210, whereby the processor is operative to perform at least some of the steps, actions and/or functions described herein.

Optionally, the wireless device, network node or network device 200 may also include a communication circuit 230. The communication circuit 230 may include functions for wired and/or wireless communication with other devices and/or network nodes in the network. In a particular example, the communication circuit 230 may be based on radio circuitry for communication with one or more other nodes, including transmitting and/or receiving information. The communication circuit 230 may be interconnected to the processor 210 and/or memory 220. By way of example, the communication circuit 230 may include any of the following: a receiver, a transmitter, a transceiver, input/output (I/O) circuitry, input port(s) and/or output port(s).

It is also possible to provide a solution based on a combination of hardware and software. The actual hardware-software partitioning can be decided by a system designer based on a number of factors including processing speed, cost of implementation and other requirements.

Figure 13:
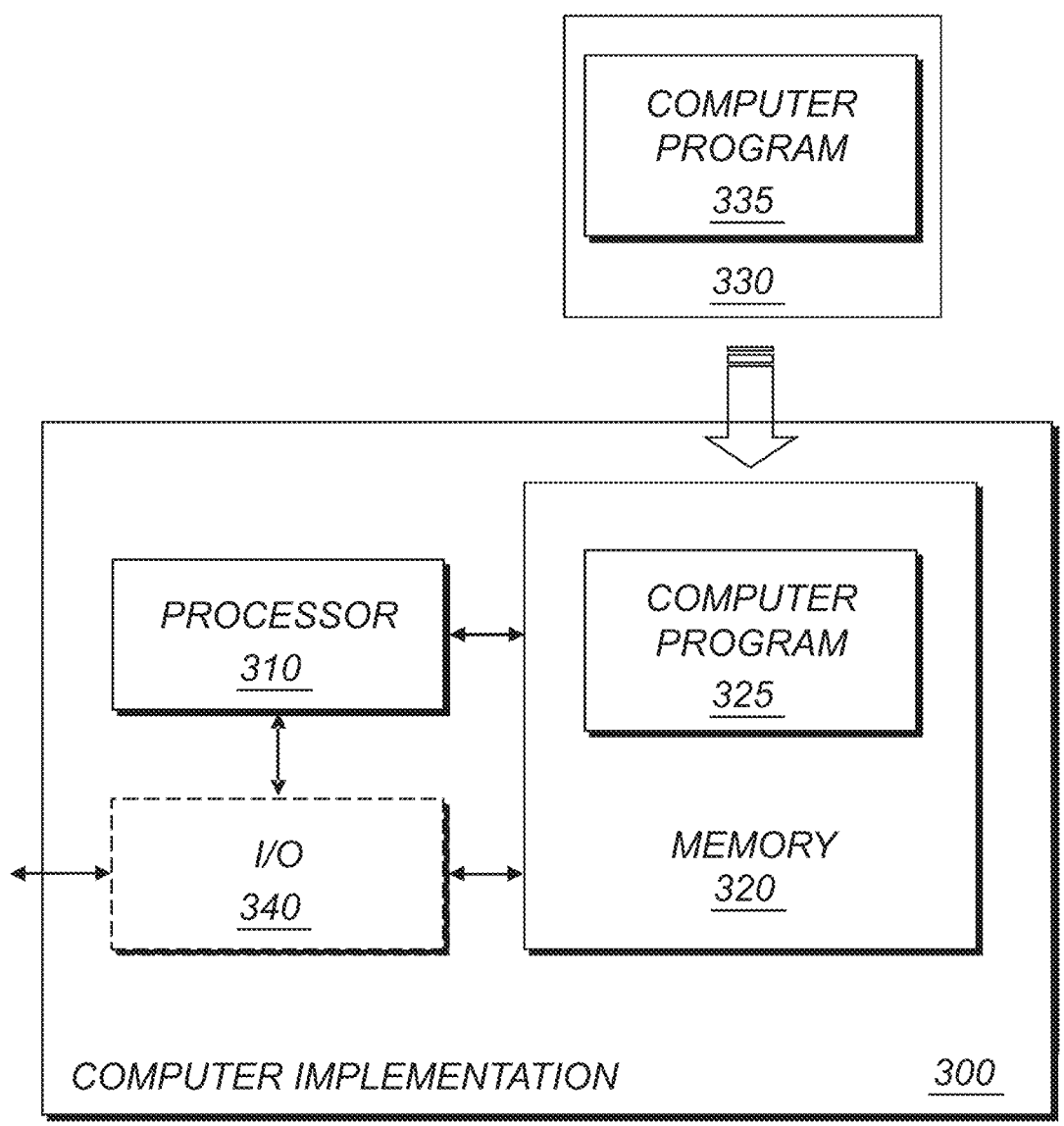
FIG. 13 is a schematic diagram illustrating an example of a computer-implementation according to an embodiment.

FIG. 13 is a schematic diagram illustrating an example of a computer-implementation according to an embodiment. In this particular example, at least some of the steps, functions, procedures, modules and/or blocks described herein are implemented in a computer program 325; 335, which is loaded into the memory 320 for execution by processing circuitry including one or more processors 310. The processor(s) 310 and memory 320 are interconnected to each other to enable normal software execution. An optional input/output device 340 may also be interconnected to the processor(s) 310 and/or the memory 320 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 310 is thus configured to perform, when executing the computer program 325, well-defined processing tasks such as those described herein.

The processing circuitry does not have to be dedicated to only execute the above-described steps, functions, procedure and/or blocks, but may also execute other tasks.

In a particular embodiment, there is provided a computer program 325; 335 for determining, when executed, a security context for communication between a wireless device and a target network node at handover. The computer program comprises instructions, which when executed by at least one processor, cause the at least one processor to:

obtain information representative of the type of Radio Access Technology, also referred to as RAT type, of the target network node; and derive and/or determine the security context at least partly based on the information representative of the RAT type.

According to a seventh aspect, there is provided a computer-program product comprising a computer-readable medium 320; 330 having stored thereon such a computer program 325; 335.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 325; 335 may be realized as a computer program product, which is normally carried or stored on a computer-readable medium 320; 330, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

As previously discussed, there is also provided a network device comprising a device configured for determining a security context as described herein.

The network device may be any suitable network device in the wireless communication system, or a network device in connection with the wireless communication system. By way of example, the network device may be a suitable network node such a base station or an access point. However, the network device may alternatively be a cloud-implemented network device.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 14:
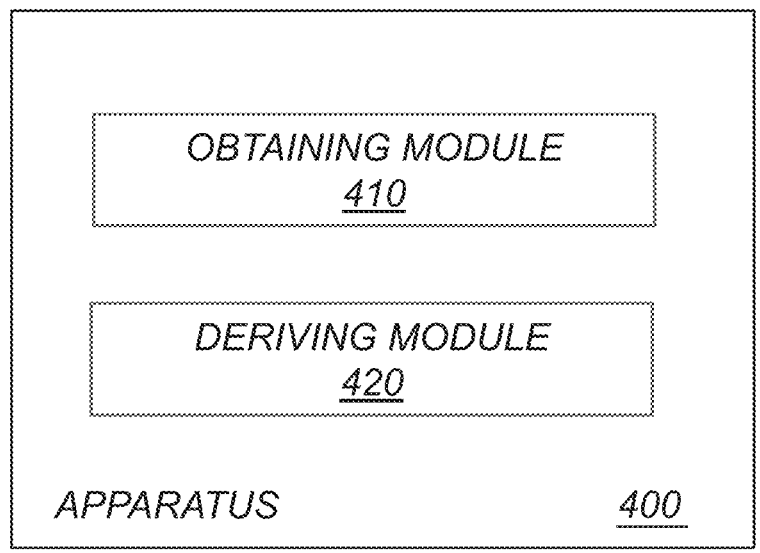
FIG. 14 is a schematic diagram illustrating an example of an apparatus for determining a security context for communication between a wireless device and a target network node at handover.

FIG. 14 is a schematic diagram illustrating an example of an apparatus for determining a security context for communication between a wireless device and a target network node at handover. The apparatus 400 comprises:

- an obtaining module 410 for obtaining information representative of the type of Radio Access Technology, also referred to as RAT type, of the target network node; and
- a deriving module 420 for deriving and/or determining the security context at least partly based on the information representative of the RAT type.

Alternatively it is possible to realize the module(s) in FIG. 14 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

Figure 15:
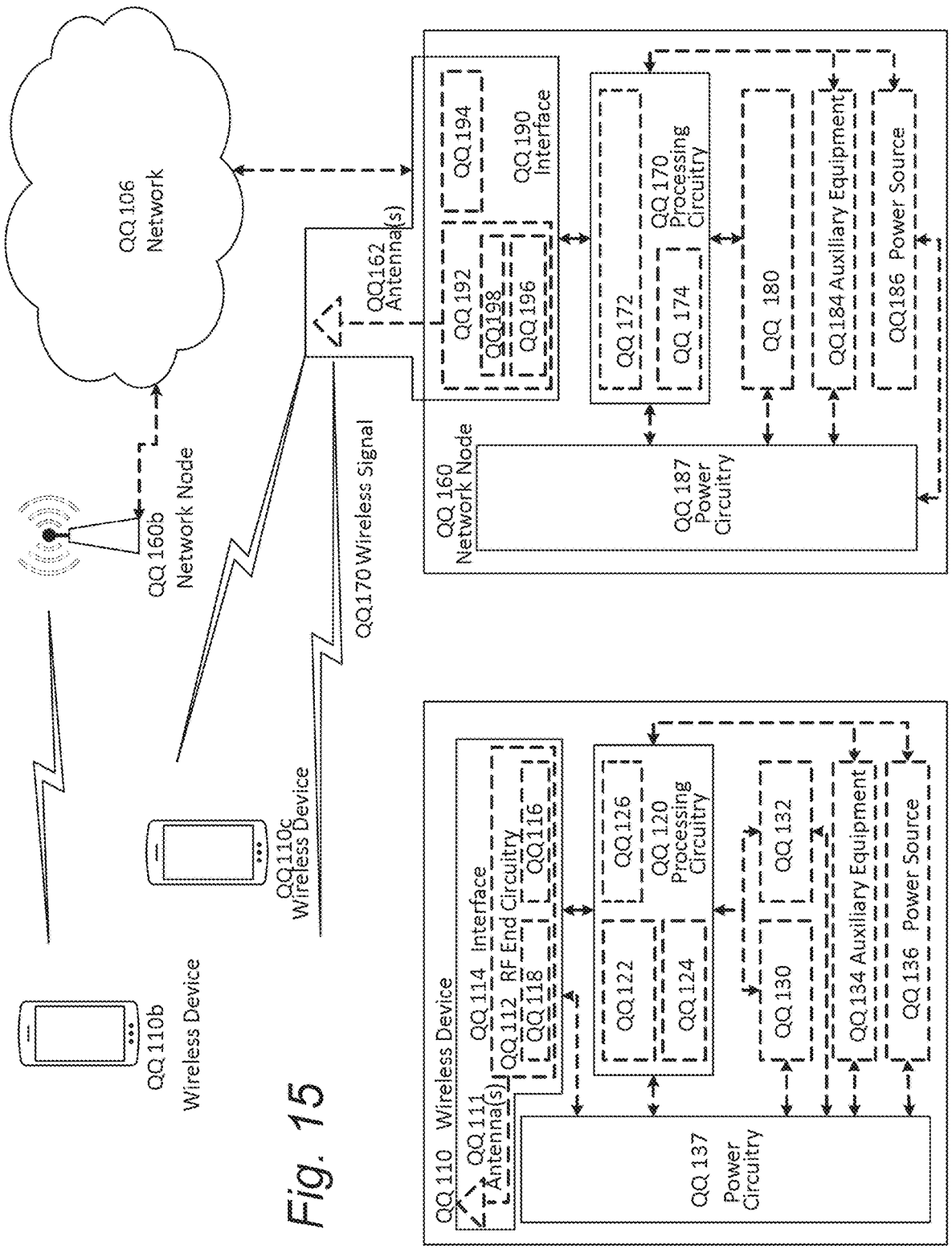
FIG. 15 is a schematic diagram illustrating an example of a wireless network in accordance with some embodiments.

By way of example, the "virtual" apparatus may be implemented in a wireless device or network node (e.g., wireless device QQ110 or network node QQ160 shown in FIG. 15). The apparatus is operable to carry out the example method described herein, e.g. with reference to FIG. 6A and/or FIG. 6B and possibly any other processes or methods disclosed herein. It is also to be understood that the method of FIG. 6A and/or FIG. 6B is not necessarily carried out solely by the apparatus in FIG. 14. At least some operations of the method can be performed by one or more other entities.

For example, the virtual apparatus may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

The term module or unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

- Consolidation of network functionality into virtualized software running on customized or generic hardware. This is sometimes referred to as network function virtualization.
- Co-location of one or more application stacks, including operating system, running on separate hardware onto a single hardware platform. This is sometimes referred to as system virtualization, or platform virtualization.
- Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

The proposed technology is generally applicable to management of security contexts in wireless communications. The proposed technology may be applied to many specific applications and communication scenarios including secure communication within wireless networks, securely providing various services within such networks, including so-called Over-the-Top (OTT) services. For example, the proposed technology may provide the underlying security context(s) for secure communication, and enables and/or includes transfer and/or transmission and/or reception of relevant user data and/or control data in wireless communications.

By way of example, there is provided a method for secure communication between a wireless device and a target network node at handover. As illustrated in FIG. 6B, the method comprises:

obtaining (S1) information representative of the type of Radio Access Technology, also referred to as RAT type, of the target network node;

deriving and/or determining (S2) a security context at least partly based on the information representative of the RAT type; and protecting (S3) the communication between the wireless device and the target network node based on the security context.

In a particular example, the step of protecting the communication includes providing integrity and/or confidentiality protection for transmission and/or reception of user data and/or control data between the wireless device and the target network node.

As an example, the method may further comprise:

providing user data; and forwarding the user data to a host computer via transmission to the target network node.

In an alternative example, the method may further comprise:
   obtaining user data; and
   forwarding the user data to a host computer or the wireless device.

By way of example, there may also be provided a corresponding device configured for secure communication between a wireless device and a target network node at handover.
   wherein the device is configured to obtain information representative of the type of Radio Access Technology, also referred to as RAT type, of the target network node;
   wherein the device is configured to derive and/or determine a security context at least partly based on the information representative of the RAT type; and
   wherein the device is configured to protect the communication between the wireless device and the target network node based on the security context.

In the following, a set of illustrative non-limiting examples will now be described with reference to FIGS. 15-21.

FIG. 15 is a schematic diagram illustrating an example of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 15. For simplicity, the wireless network of FIG. 15 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 15, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 15 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 15 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). A vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal. As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WO QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 16:
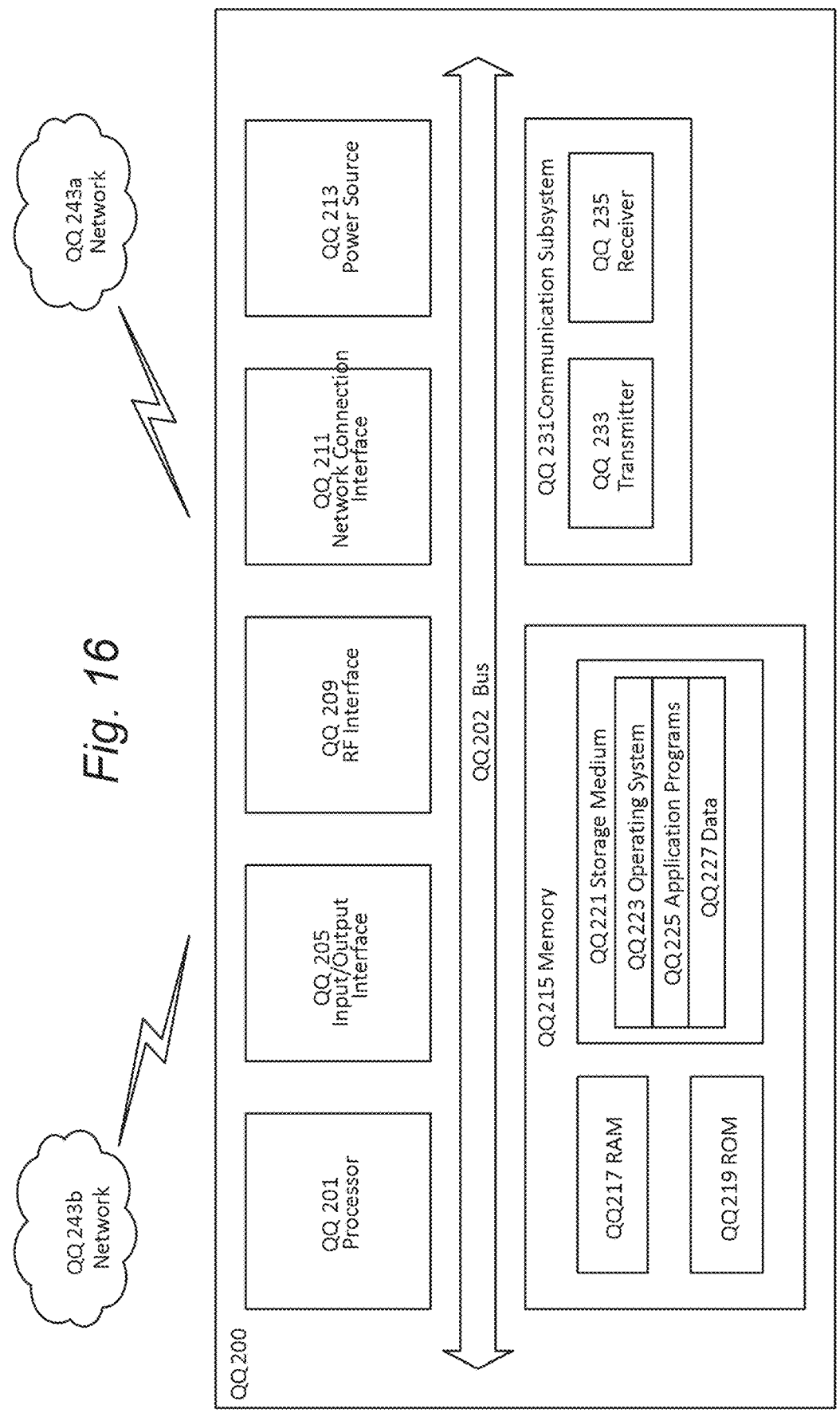
FIG. 16 is a schematic diagram illustrating an example of an embodiment of a UE in accordance with various aspects described herein.

FIG. 16 is a schematic diagram illustrating an example of an embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the $3^{rd}$ Generation Partnership Project (3GPP), including a NB-IoT UE, a machine type communication (MTC) UE, and/or an enhanced MTC (eMTC) UE. UE QQ200, as illustrated in FIG. 16, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 16 is a UE, the components discussed herein are equally applicable to a WD, and vice-versa.

In FIG. 16, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 16, or only a subset of the components. The level of integration between the components may vary from one UE to another UE. Further, certain UEs may contain multiple instances of a component, such as multiple processors, memories, transceivers, transmitters, receivers, etc.

In FIG. 16, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 16, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 16, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 17:
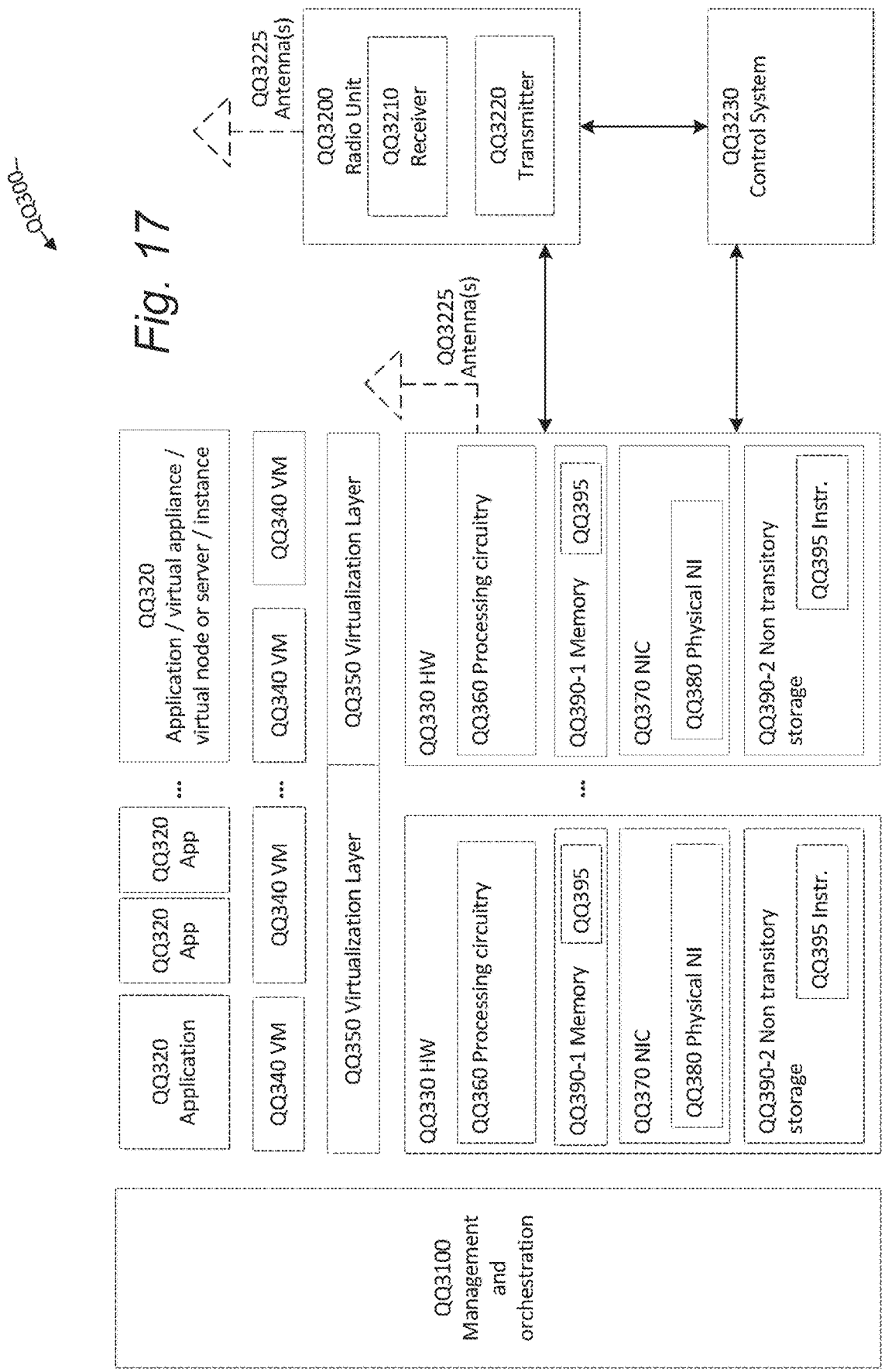
FIG. 17 is a schematic block diagram illustrating an example of a virtualization environment in which functions implemented by some embodiments may be virtualized.

FIG. 17 is a schematic block diagram illustrating an example of a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 17, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (UNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 17.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 18:
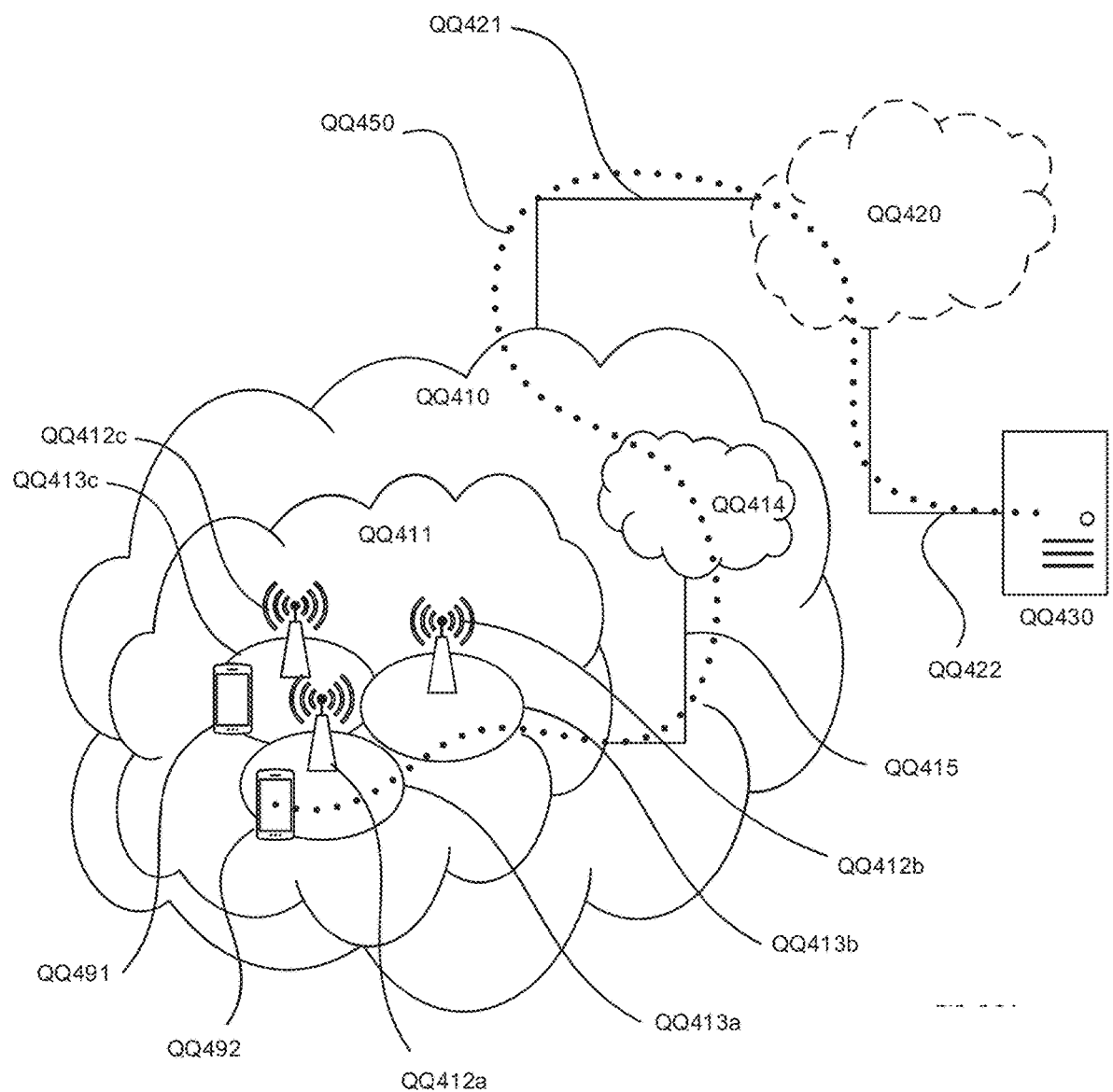
FIG. 18 is a schematic diagram illustrating an example of a telecommunication network connected via an intermediate network to a host computer in accordance with some embodiments.

FIG. 18 is a schematic diagram illustrating an example of a telecommunication network connected via an intermediate network to a host computer in accordance with some embodiments.

With reference to FIG. 18, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 18 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 19:
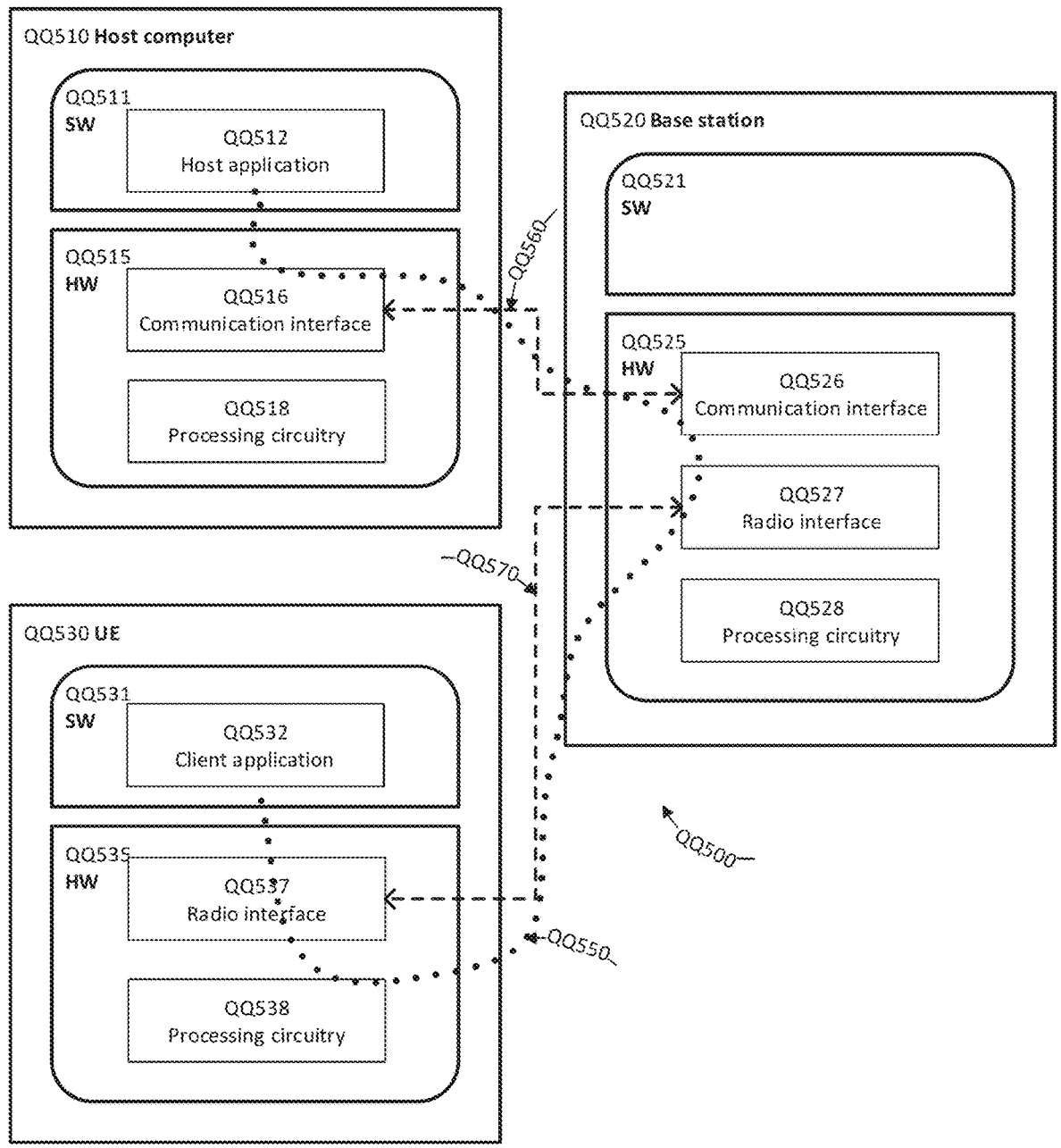
FIG. 19 is a schematic diagram illustrating an example of a host computer communicating via a base station with a user equipment over a partially wireless connection in accordance with some embodiments

FIG. 19 is a schematic diagram illustrating an example of a host computer communicating via a base station with a user equipment over a partially wireless connection in accordance with some embodiments Example implementations, in accordance with an embodiment, of the UE, base station and host computer discussed in the preceding paragraphs will now be described with reference to FIG. 19. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 19) served by base station QQ520. Communication interface QQ526 may be configured to facilitate connection QQ560 to host computer QQ510. Connection QQ560 may be direct or it may pass through a core network (not shown in FIG. 19) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. The hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 19 may be similar or identical to host computer QQ430, one of base stations QQ412a, QQ412b, QQ412c and one of UEs QQ491, QQ492 of FIG. 18, respectively. This is to say, the inner workings of these entities may be as shown in FIG. 19 and independently, the surrounding network topology may be that of FIG. 18.

In FIG. 19, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 20A:
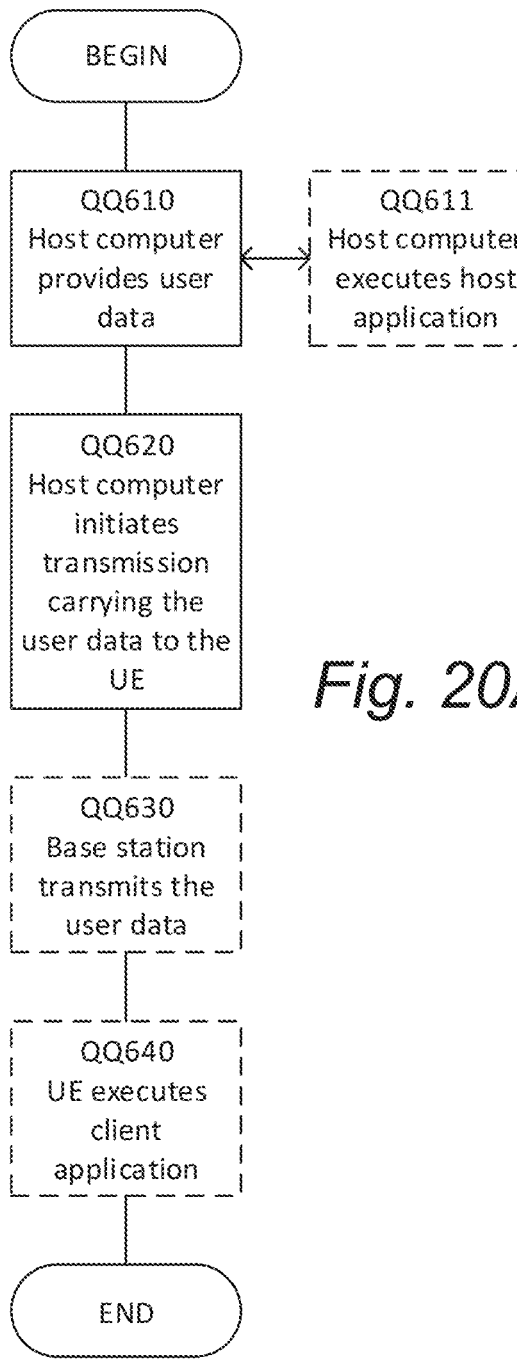
FIGS. 20A-B are schematic flow diagrams illustrating examples of methods implemented in a communication system including, e.g. a host computer, and optionally also a base station and a user equipment in accordance with some embodiments.
Figure 20B:
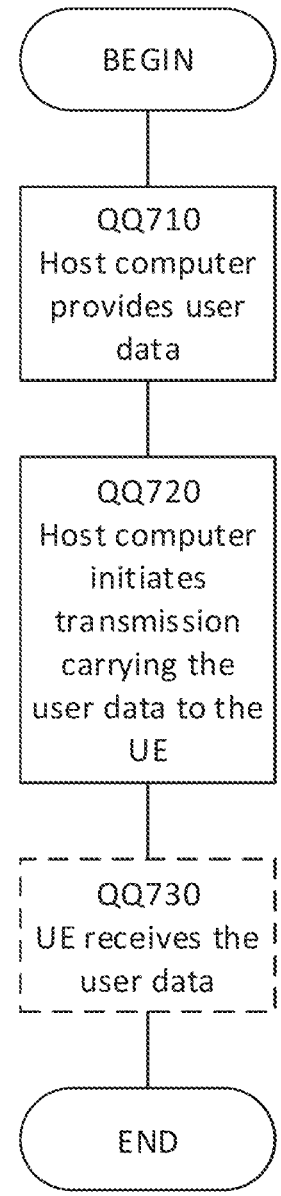

FIGS. 20A-B are schematic flow diagrams illustrating examples of methods implemented in a communication system including, e.g. a host computer, and optionally also a base station and a user equipment in accordance with some embodiments.

FIG. 20A is a flowchart illustrating a method implemented in a communication system, in accordance with one embodiment. The communication system includes a host computer, a base station and a UE which may be those described with reference to FIG. 18 and FIG. 19. For simplicity of the present disclosure, only drawing references to FIG. 20A will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. 20B is a flowchart illustrating a method implemented in a communication system, in accordance with one embodiment. The communication system includes a host computer, a base station and a UE which may be those described with reference to FIG. 18 and FIG. 19. For simplicity of the present disclosure, only drawing references to FIG. 20B will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 21A:
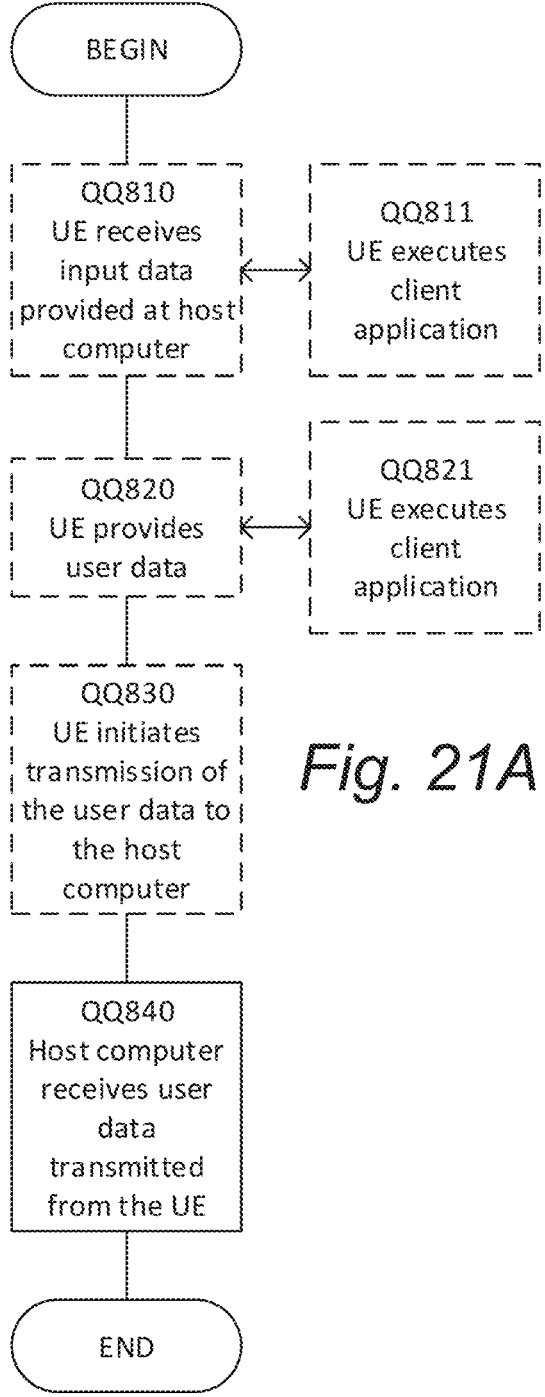
FIGS. 21A-B are schematic diagrams illustrating examples of methods implemented in a communication system including a host computer, a base station and a user equipment in accordance with some embodiments.
Figure 21B:
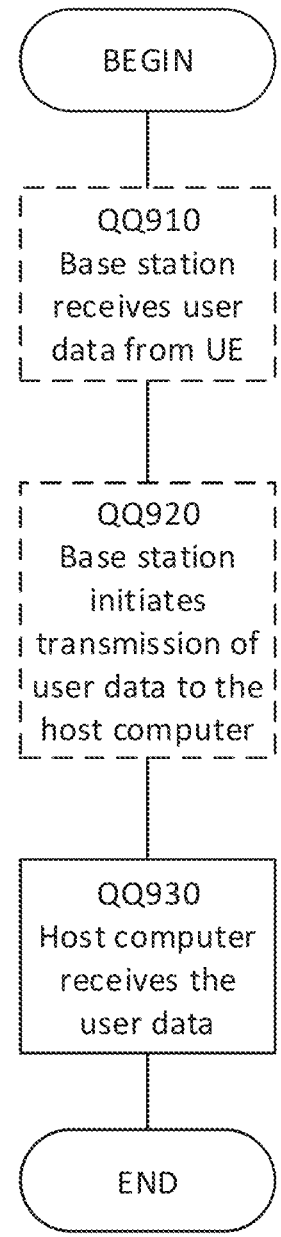

FIGS. 21A-B are schematic diagrams illustrating examples of methods implemented in a communication system including a host computer, a base station and a user equipment in accordance with some embodiments.

FIG. 21A is a flowchart illustrating a method implemented in a communication system, in accordance with one embodiment. The communication system includes a host computer, a base station and a UE which may be those described with reference to FIG. 18 and FIG. 19. For simplicity of the present disclosure, only drawing references to FIG. 21A will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. 21B is a flowchart illustrating a method implemented in a communication system, in accordance with one embodiment. The communication system includes a host computer, a base station and a UE which may be those described with reference to FIG. 18 and FIG. 19. For simplicity of the present disclosure, only drawing references to FIG. 21B will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

In the following, examples of illustrative and non-limiting numbered embodiments will be given:

Group A Embodiments

1. A method performed by a wireless device for determining a security context for communication between the wireless device and a target network node at handover from a source network node to the target network node, the method comprising:
obtaining information representative of the type of Radio Access Technology, also referred to as RAT type, of the target network node; and
deriving and/or determining the security context at least partly based on the information representative of the RAT type.
2. The method of embodiment 1 further comprising the step of protecting communication between the wireless device and the target network node based on the security context.
3. The method of embodiment 1 or 2, further comprising:
providing user data; and
forwarding the user data to a host computer via the transmission to the target network node.

Group B Embodiments

4. A method performed by a network node for determining a security context for communication between a wireless device and a target network node at handover from a source network node to the target network node, the method comprising:
obtaining information representative of the type of Radio Access Technology, also referred to as RAT type, of the target network node; and
deriving and/or determining the security context at least partly based on the information representative of the RAT type.
5. The method of embodiment 4 further comprising the step of protecting communication between the wireless device and the target network node based on the security context.
6. The method of any of the previous embodiments, further comprising:
obtaining user data; and
forwarding the user data to a host computer or a wireless device.

Group C Embodiments

7. A wireless device comprising processing circuitry configured to perform any of the steps of any of the Group A embodiments.
8. A network node such as a base station comprising processing circuitry configured to perform any of the steps of any of the Group B embodiments.
9. A user equipment (UE) comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.
10. A communication system including a host computer comprising:
processing circuitry configured to provide user data; and
a communication interface configured to forward the user data to a cellular network for transmission to a user equipment (UE).
wherein the cellular network comprises a base station having a radio interface and processing circuitry, the base station's processing circuitry configured to perform any of the steps of any of the Group B embodiments.
11. The communication system of embodiment 10, further including the base station.
12. The communication system of embodiment 10 or 11, further including the UE, wherein the UE is configured to communicate with the base station.
13. The communication system of any of the embodiments 10 to 12, wherein:
the processing circuitry of the host computer is configured to execute a host application, thereby providing the user data; and
the UE comprises processing circuitry configured to execute a client application associated with the host application.
14. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.
15. The method of embodiment 14, further comprising, at the base station, transmitting the user data.
16. The method of the embodiment 14 or 15, wherein the user data is provided at the host computer by executing a host application, the method further comprising, at the UE, executing a client application associated with the host application.
17. A user equipment (UE) configured to communicate with a base station, the UE comprising a radio interface and processing circuitry configured to perform any of the steps of any of the Group A embodiments.
18. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.
19. The communication system of embodiment 18, wherein the cellular network further includes a base station configured to communicate with the UE.
20. The communication system of embodiment 18 or 19, wherein:
the processing circuitry of the host computer is configured to execute a host application, thereby providing the user data; and
the UE's processing circuitry is configured to execute a client application associated with the host application.

21. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.

22. The method of embodiment 21, further comprising at the UE, receiving the user data from the base station.

23. A communication system including a host computer comprising:
a communication interface configured to receive user data originating from a transmission from a user equipment (UE) to a base station,
wherein the UE comprises a radio interface and processing circuitry, the UE's processing circuitry configured to perform any of the steps of any of the Group A embodiments.

24. The communication system of embodiment 23, further including the UE.

25. The communication system of embodiment 23 or 24, further including the base station, wherein the base station comprises a radio interface configured to communicate with the UE and a communication interface configured to forward to the host computer the user data carried by a transmission from the UE to the base station.

26. The communication system of any of the embodiments 23 to 25, wherein:
the processing circuitry of the host computer is configured to execute a host application; and
the UE's processing circuitry is configured to execute a client application associated with the host application, thereby providing the user data.

27. The communication system of any of the embodiments 23 to 26, wherein:
the processing circuitry of the host computer is configured to execute a host application, thereby providing request data; and
the UE's processing circuitry is configured to execute a client application associated with the host application, thereby providing the user data in response to the request data.

28. A method implemented in a communication system including a host computer, a base station and a user equipment (UE), the method comprising:
at the host computer, receiving user data transmitted to the base station from the UE, wherein the UE performs any of the steps of any of the Group A embodiments.

29. The method of embodiment 28, further comprising, at the UE, providing the user data to the base station.

30. The method of embodiment 28 or 29, further comprising:
at the UE, executing a client application, thereby providing the user data to be transmitted; and
at the host computer, executing a host application associated with the client application.

31. The method of any of the embodiments 28 to 30, further comprising:
at the UE, executing a client application; and
at the UE, receiving input data to the client application, the input data being provided at the host computer by executing a host application associated with the client application,
wherein the user data to be transmitted is provided by the client application in response to the input data.

32. A communication system including a host computer comprising:
a communication interface configured to receive user data originating from a transmission from a user equipment (UE) to a base station,
wherein the base station comprises a radio interface and processing circuitry, the base station's processing circuitry configured to perform any of the steps of any of the Group B embodiments.

33. The communication system of embodiment 32 further including the base station.

34. The communication system of embodiment 32 or 33, further including the UE, wherein the UE is configured to communicate with the base station.

35. The communication system of any of the embodiments 32 to 34, wherein:
the processing circuitry of the host computer is configured to execute a host application;
the UE is configured to execute a client application associated with the host application, thereby providing the user data to be received by the host computer.

36. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

37. The method of embodiment 36, further comprising at the base station, receiving the user data from the UE.

38. The method of embodiment 36 or 37, further comprising at the base station, initiating a transmission of the received user data to the host computer.

Group D Embodiments

39. A method for determining a security context for communication between a wireless device and a target network node at handover, wherein the method comprises:
obtaining information representative of the type of Radio Access Technology, also referred to as RAT type, of the target network node; and
deriving and/or determining the security context at least partly based on the information representative of the RAT type.

40. A device configured to determine a security context for communication between a wireless device and a target network node at handover,
wherein the device is configured to obtain information representative of the type of Radio Access Technology, also referred to as RAT type, of the target network node; and
wherein the device is further configured to derive and/or determine the security context at least partly based on the information representative of the RAT type.

41. A wireless device comprising a device according to embodiment 40.

42. A network node comprising a device according to embodiment 40.

43. A network device comprising a device according to embodiment 40.

44. A computer program or determining, when executed, a security context for communication between a wireless device and a target network node at handover, wherein the computer program comprises instructions, which when executed by at least one processor, cause the at least one processor to:
obtain information representative of the type of Radio Access Technology, also referred to as RAT type, of the target network node;
derive and/or determine the security context at least partly based on the information representative of the RAT type.

45. A computer-program product comprising a computer-readable medium having stored thereon a computer program of embodiment 44.

46. An apparatus for determining a security context for communication between a wireless device and a target network node at handover, wherein the apparatus comprises:
an obtaining module for obtaining information representative of the type of Radio Access Technology, also referred to as RAT type, of the target network node; and
a deriving module for deriving and/or determining the security context at least partly based on the information representative of the RAT type.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES 1. 3GPP TS 23.501, v1.3.0, Clause 4.2
2. 3GPP TS 23.502, v1.0.0, Clause 4.9.1
3. 3GPP TS 38.300, v1.0.0, Clause 9.2.3
4. 3GPP TS 38.413, v.0.3.0, Clause 8.4
5. 3GPP TS 38.423, v.0.2.0, Clause 8.2
6. 3GPP TS 33.401, v.15.1.0, Clause 7.2.8.1.1 and A.5
7. 3GPP TS 33.220, v15.0.0, Clause B.2

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method for determining a security context for communication between a wireless device and a target network node at handover of the wireless device in a wireless network, wherein the method is performed by a network node or device other than the target network node, wherein the method comprises:
obtaining first information representative of the type of Radio Access Technology (RAT) of the target network node and second information representing properties, other than the type of RAT, of a target cell for the handover, wherein the first information does not represent the properties represented by the second information; and
deriving and/or determining the security context at least partly based on the first information representative of the type of RAT.

2. The method of claim 1, wherein the security context comprises at least an Access Stratum (AS) base security key.

3. The method of claim 2, wherein the AS base security key is $K_{gNB*}$ or $K_{ng\text{-}eNB*}$.

4. The method of claim 1, wherein the first information representative of the type of RAT is obtained by at least one of receiving the first information and determining the first information.

5. The method of claim 1, further comprising deriving a new security key based on the first information representative of the type of RAT and information representative of a security key valid before handover.

6. The method of claim 5, wherein the information representative of a security key valid before handover includes information about one of the following: a base security key used before handover, or an intermediary key valid before handover.

7. The method of claim 1, wherein deriving and/or determining the security context is further based on the second information representing the properties of the target cell other than the type of RAT.

8. The method of claim 1, wherein deriving and/or determining the security context is based on using a parameter representative of the type of RAT as an input to a new or existing key derivation function.

9. The method of claim 8, wherein the input to the key derivation is different for Long Term Evolution (LTE) and New radio (NR) RATs.

10. The method of claim 1, wherein deriving and/or determining the security context is based on using different key derivation functions (KDFs) for different types of RATs.

11. The method of claim 10, wherein the different KDFs comprise a first KDF for LTE and a second KDF for NR.

12. The method of claim 1, wherein the method is applied at intra-RAT and/or inter-RAT handovers within the same core network.

13. The method of claim 1, wherein the method is performed by the wireless device.

14. The method of claim 1, wherein the method is performed by a network node.

15. The method of claim 14, wherein the handover is from a source network node to the target network node, and the method is performed by the source network node.

16. The method of claim 15, wherein the handover is an Xn handover and the first information representative of the type of RAT is obtained based on Xn signaling or pre-configuration.

17. The method of claim 1, wherein the method is performed by an Access and Mobility management Function (AMF) network device in the core network.

18. The method of claim 17, wherein the first information representative of the type of RAT is obtained based on N2 signaling or pre-configuration.

19. The method of claim 1, wherein communication between the wireless device and the target network node is protected, based on the security context, for at least one of integrity and confidentiality.

20. A device configurable to determine a security context for communication between a wireless device and a target network node at handover of the wireless device in a wireless network, the device being a network node or device other than the target network node, the device comprising:
at least one processor; and
at least one memory storing computer-executable instructions that, when executed by the at least one processor, configure the device to:
obtain first information representative of the type of Radio Access Technology (RAT) of the target network node and second information representing properties, other than the type of RAT, of a target cell for the handover, wherein the first information does not represent the properties represented by the second information; and derive and/or determine the security context based on the first information representative of the type of RAT.

21. The device of claim 20, wherein execution of the instructions configures the device to derive and/or determine at least an Access Stratum (AS) base security key as part of the security context.

22. The device of claim 21, wherein the AS base security key is $K_{gNB*}$ or $K_{ng-eNB*}$.

23. The device of claim 20, wherein execution of the instructions configures the device to receive and/or determine the first information representative of the type of RAT.

24. The device of claim 20, wherein execution of the instructions configures the device to derive a new security key to be used after handover based on the first information representative of the type of RAT and information representative of a security key valid before handover.

25. The device of claim 20, wherein execution of the instructions configures the device to derive the security context based on the first information representative of the type of RAT by using a parameter representative of the type of RAT as an input to a new or existing key derivation function.

26. The device of claim 20, wherein execution of the instructions configures the device to derive the security context based on the first information representative of the type of RAT by using different key derivation functions for different types of RATs.

* * * * *

UNITED STATES PATENT AND TRADEMARK OFFICE
CERTIFICATE OF CORRECTION

Page 1 of 1

PATENT NO. : 11,122,427 B2
APPLICATION NO. : 16/067256
DATED : September 14, 2021
INVENTOR(S) : Ohlsson et al.

It is certified that error appears in the above-identified patent and that said Letters Patent is hereby corrected as shown below:

In the Drawings

In Fig. 5, Sheet 5 of 21, delete " 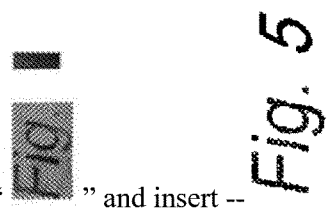 " and insert --  --, therefor.

In the Specification

In Column 4, Line 16, delete "network least partly" and insert -- network node. The device is further configured to derive and/or determine the security context at least partly --, therefor.

In Column 7, Line 7, delete "modern," and insert -- modem, --, therefor.

In Column 9, Line 66, delete "$K_{gNB*}/K_{gNB*}$" and insert -- $K_{gNB.}/K_{gNB*}$ --, therefor.

In Column 29, Line 1, delete "WO QQ110," and insert -- WD QQ110, --, therefor.

In Column 36, Line 31, delete "(UNE)." and insert -- (VNEs). --, therefor.

In Column 45, Line 1, delete "program or determining," and insert -- program for determining, --, therefor.

In the Claims

In Column 47, Line 61-62, in Claim 1, delete "context at least partly based" and insert -- context based --, therefor.

Signed and Sealed this
First Day of March, 2022

Drew Hirshfeld
*Performing the Functions and Duties of the*
*Under Secretary of Commerce for Intellectual Property and*
*Director of the United States Patent and Trademark Office*